United States Patent
Mishima et al.

(10) Patent No.: US 9,179,119 B2
(45) Date of Patent: Nov. 3, 2015

(54) THREE DIMENSIONAL IMAGE PROCESSING DEVICE, METHOD AND COMPUTER PROGRAM PRODUCT, AND THREE-DIMENSIONAL IMAGE DISPLAY APPARATUS

(75) Inventors: Nao Mishima, Tokyo (JP); Takeshi Mita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 528 days.

(21) Appl. No.: 13/593,594

(22) Filed: Aug. 24, 2012

(65) Prior Publication Data

US 2013/0162783 A1 Jun. 27, 2013

(30) Foreign Application Priority Data

Dec. 21, 2011 (JP) ................................. 2011-280468

(51) Int. Cl.
H04N 13/00 (2006.01)
(52) U.S. Cl.
CPC ......... *H04N 13/0011* (2013.01); *H04N 13/004* (2013.01)
(58) Field of Classification Search
CPC .............. H04N 13/404; H04N 13/409; H04N 2013/0465; G06T 19/00; G06T 19/20; G06T 17/00; G03B 21/625
USPC ............ 348/43, 51, 54, 58–60; 345/419, 427; 359/455, 463–465; 349/15
See application file for complete search history.

(56) References Cited

U.S. PATENT DOCUMENTS 7,495,634 B2 2/2009 Takagi et al.
8,289,379 B2 10/2012 Takahashi et al.
8,723,933 B2 5/2014 Takahashi et al.
2005/0264881 A1 12/2005 Takagi et al.
2007/0040778 A1 2/2007 Karman et al.

(Continued)

FOREIGN PATENT DOCUMENTS

CN 1703099 A 11/2005
CN 1864089 A 11/2006

(Continued)

OTHER PUBLICATIONS

Office Action issued by the Taiwanese Patent Office on Jun. 27, 2014, for Taiwanese Patent Application No. 101108118, and English-language translation thereof.

(Continued)

*Primary Examiner* — Victor Kostak
(74) *Attorney, Agent, or Firm* — Finnegan, Henderson, Farabow, Garrett & Dunner, L.L.P.

(57) ABSTRACT

In an embodiment, an image processing device includes: a first acquiring unit that acquires a plurality of parallax images having parallax between one another; a second acquiring unit that acquires identification information of a parallax image to be observed from a predetermined observing point position in each of a plurality of regions into which a display area on which three-dimensional image is configured to be displayed is divided, each of the regions including at least one element image, and the element image including each pixel in the plurality of parallax images; a corrector that corrects pixels at positions corresponding to the regions in the parallax images into pixels of parallax images identified by the identification information; and a first generator that generates the three-dimensional image from the parallax images resulting from the correction.

8 Claims, 16 Drawing Sheets

(56) References Cited

U.S. PATENT DOCUMENTS

| | | | |
|---|---|---|---|
| 2007/0165145 A1* | 7/2007 | Sugiyama | 349/15 |
| 2009/0079761 A1* | 3/2009 | Kokojima | 345/619 |
| 2009/0079818 A1* | 3/2009 | Saishu et al. | 348/51 |
| 2009/0244066 A1* | 10/2009 | Sugita et al. | 345/427 |
| 2010/0039504 A1 | 2/2010 | Takahashi et al. | |
| 2010/0073463 A1* | 3/2010 | Momonoi et al. | 348/47 |
| 2011/0051239 A1 | 3/2011 | Daiku | |
| 2011/0102425 A1* | 5/2011 | Ohta | 345/419 |
| 2012/0038632 A1 | 2/2012 | Matsunaga et al. | |
| 2012/0044330 A1* | 2/2012 | Watanabe | 348/54 |
| 2012/0081513 A1* | 4/2012 | Yamada | 348/43 |
| 2012/0113101 A1* | 5/2012 | Yamamoto et al. | 345/419 |
| 2012/0154554 A1* | 6/2012 | Ootuki et al. | 348/51 |
| 2012/0182290 A1* | 7/2012 | Takahashi et al. | 345/419 |
| 2012/0194512 A1* | 8/2012 | Kim et al. | 345/419 |
| 2012/0212591 A1* | 8/2012 | Yamada | 348/54 |
| 2012/0327200 A1 | 12/2012 | Takahashi et al. | |
| 2013/0058563 A1* | 3/2013 | Yoshida | 382/154 |

FOREIGN PATENT DOCUMENTS

| | | | |
|---|---|---|---|
| CN | 101651842 A | | 2/2010 |
| JP | 2009-251098 | | 10/2009 |
| JP | 2012-60625 | | 3/2012 |
| TW | 201120479 A1 | | 6/2011 |

OTHER PUBLICATIONS

N. Mishima et al., "Device and Method for Image Processing and Autostereoscopic Image Display Apparatus," U.S. Appl. No. 13/415,175, filed Mar. 8, 2012.

Notification of the First Office Action issued by the State Intellectual Property Office of the People's Republic of China on Aug. 29, 2014, and English-language translation thereof.

Notification of Reason(s) for Refusal for Japanese Patent Application No. 2011-280468, with English translation, mailed Jul. 29, 2014 (5 pages).

Second Office Action; issued from the State Intellectual Property Office of People's Republic of China in corresponding Patent Application No. 201210069754.3, dated May 15, 2015, 7 pp.

Office Action in Japanese Patent Application No. 2011-280468, mailed Feb. 10, 2015, with English translation (5 pages).

* cited by examiner

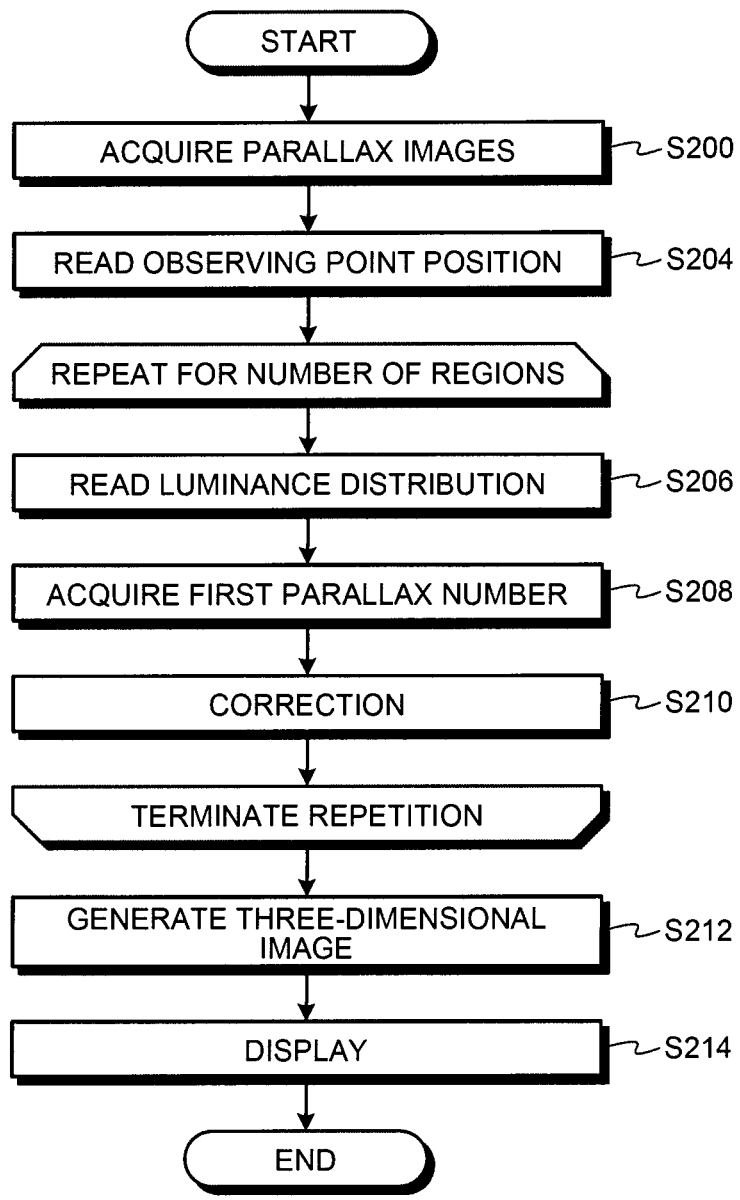

THREE DIMENSIONAL IMAGE PROCESSING DEVICE, METHOD AND COMPUTER PROGRAM PRODUCT, AND THREE-DIMENSIONAL IMAGE DISPLAY APPARATUS

CROSS-REFERENCE TO RELATED APPLICATIONS

This application is based upon and claims the benefit of priority from Japanese Patent Application No. 2011-280468, filed on Dec. 21, 2011; the entire contents of which are incorporated herein by reference.

FIELD

Embodiments described herein relate generally to an image processing device, a method therefor, a computer program product therefor, and an image display apparatus.

BACKGROUND

There are image display apparatuses allowing viewers to observe three-dimensional images. An image display apparatus includes, on a front face of a display panel on which a plurality of pixels are arranged, a light beam controller that controls the emitting directions of light beams from the pixels, and displays a plurality of parallax images having parallax between one another.

For example, in a case of a sheet display or the like where a display area itself can be bent or where parts of a panel and a lens are deformed or removed because of aged deterioration, an image on such an image display apparatus does not appear three-dimensional to viewers.

BRIEF DESCRIPTION OF THE DRAWINGS

FIG. 15 is a flowchart illustrating procedures of image processing according to the second embodiment;

DETAILED DESCRIPTION

In an embodiment, an image processing device includes: a first acquiring unit, a second acquiring unit, a corrector, and a first generator. The first acquiring unit is configured to acquire a plurality of parallax images having parallax between one another. The second acquiring unit is configured to acquire identification information of a parallax image to be observed from a predetermined observing point position in each of a plurality of regions into which a display area on which three-dimensional image is configured to be displayed is divided, each of the regions including at least one element image, and the element image including each pixel in the plurality of parallax images. The corrector is configured to correct pixels at positions corresponding to the regions in the parallax images into pixels of parallax images identified by the identification information. The first generator is configured to generate the three-dimensional image from the parallax images resulting from the correction by the corrector.

First Embodiment

An image processing device according to this embodiment can be used in an image display apparatus, with which a viewer can view a three-dimensional image with naked eyes, such as a television (TV) set, a personal computer (PC), a smart phone and a digital photo frame. A three-dimensional image is an image including a plurality of parallax images having parallax between one another. Note that images mentioned in the embodiments may be either static images or moving images.

Figure 1:
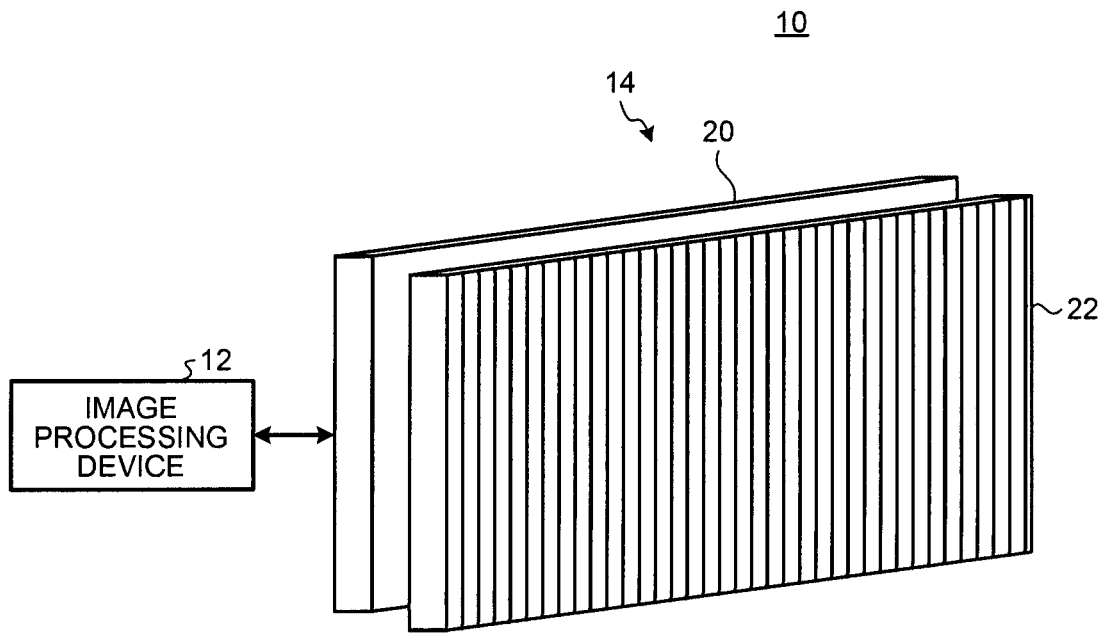
FIG. 1 is a schematic view of an image display apparatus according to a first embodiment.

FIG. 1 is a schematic view of an image display apparatus 10 according to this embodiment. The image display apparatus 10 includes a display device 14 and an image processing device 12.

The display device 14 displays three-dimensional images. The display device 14 employs a 3D display system such as the integral imaging system (II system) or the multi-view system.

The display device 14 includes a display panel 20 and a light beam controller 22. The display panel 20 is a liquid crystal panel in which a plurality of sub-pixels (R, G, and B, for example) having color components are arranged in a matrix in a first direction (the row direction (horizontal) in FIG. 1, for example) and a second direction (the column direction (vertical) in FIG. 1, for example). In this case, sub-pixels of R, G and B arranged in the first direction constitute one pixel. An image displayed by a pixel group in which adjacent pixels are arranged in the first direction where the number of pixels corresponds to the number of parallaxes is referred to as an element image. Thus, the display device 14 displays a three-dimensional image in which a plurality of element images is arranged in a matrix. The arrangement of sub-pixels in the display device 14 may be another known arrangement. Furthermore, the colors of the sub-pixels are not limited to three colors of R, G and B. For example, four or more colors may be used.

The display panel 20 may be a direct-view two-dimensional display, such as an organic electro luminescence (organic EL), a liquid crystal display (LCD), a plasma display panel (PDP), or a projection display. Alternatively, the display panel 20 may include a backlight.

The light beam controller 22 is opposed to the display panel 20 with a space therebetween. The light beam controller 22 controls the emitting directions of light beams from the pixels of the display panel 20. The light beam controller 22 has a plurality of linearly extending optical openings for emitting light beams, which is arranged along the first direction. The light beam controller 22 may be lenticular sheeting having a plurality of cylindrical lenses that are arrayed, or a parallax barrier having a plurality of slits that are arrayed. The optical openings are arranged to correspond to the element images of the display panel 20, respectively.

In this embodiment, described will be a case where the image display apparatus 10 employs a "vertical stripe arrangement" in which sub-pixels of the same color component are arranged in the second direction and the pattern of the color components are repeated in the first direction. In addition, in this embodiment, a case where the light beam controller 22 is arranged so that the extending direction of the optical openings thereof corresponds to the second direction of the display panel 20 will be described.

Alternatively, the light beam controller 22 may be arranged so that the extending direction of the optical openings thereof has a predetermined slope with respect to the second direction of the display panel 20.

Figure 2:
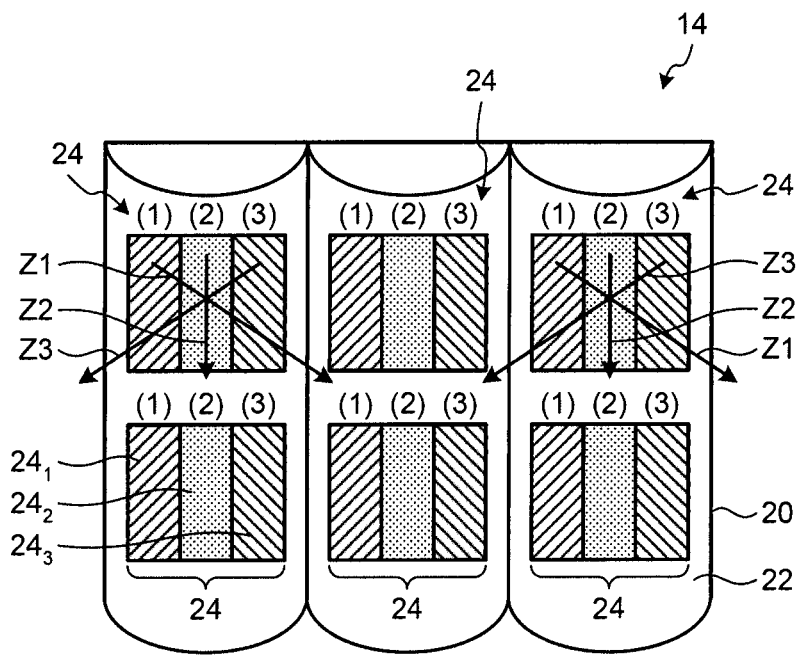
FIG. 2 is a schematic diagram illustrating a display device.

FIG. 2 is a schematic diagram illustrating a partial area of the display device 14 in an enlarged manner. Reference numerals (1) to (3) in FIG. 2 each represent identification information of a parallax image. In this embodiment, a parallax number assigned uniquely to each of the parallax images is used as the identification information of a parallax image. Pixels having the same parallax number are pixels displaying the same parallax image. In the example illustrated in FIG. 2, pixels of parallax images identified by the parallax numbers are arranged in the order of the parallax numbers 1 to 3, which form an element image 24. While the number of parallaxes is three (parallax numbers 1 to 3) in the example of FIG. 2, the number of parallaxes may be other than three (for example, nine parallaxes of parallax numbers 1 to 9).

As illustrated in FIG. 2, the display panel 20 has element images 24 arranged in a matrix in the first and second directions. In a case where the number of parallaxes is three, each element image 24 is a group of pixels in which a pixel $24_1$ of a parallax image 1, a pixel $24_2$ of a parallax image 2 and a pixel $24_3$ of a parallax image 3 are arranged in this order in the first direction.

Light beams emitted from the pixels (pixels $24_1$ to $24_3$) of the parallax images in each element image 24 reach the light beam controller 22. The light beam controller 22 then controls the traveling directions and the scattering of the light beams and emits the light beams toward the entire surface of the display device 14. For example, light emitted from the pixel $24_1$ of the parallax image 1 in each element image 24 is emitted in the direction of an arrow Z1. Light emitted from the pixel $24_2$ of the parallax image 2 in each element image 24 is emitted in the direction of an arrow Z2. Light emitted from the pixel $24_3$ of the parallax image 3 in each element image 24 is emitted in the direction of an arrow Z3. In the display device 14, the emitting direction of light emitted from each pixel of each element image 24 is controlled by the light beam controller 22 in this manner.

Figure 3:
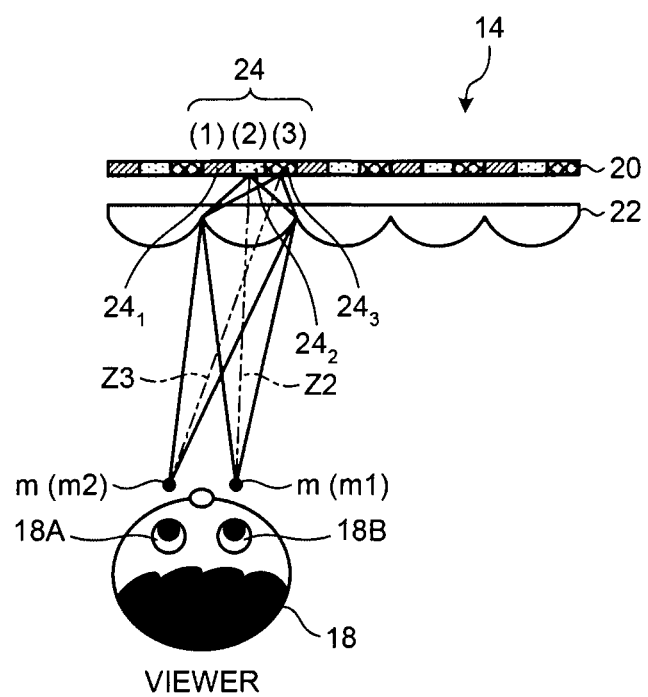
FIG. 3 is a schematic diagram illustrating the display device.

FIG. 3 is a schematic diagram illustrating a state in which a viewer 18 views the display device 14. A three-dimensional image including a plurality of element images 24 is displayed on the display panel 20. Then, the viewer 18 will observe pixels of different parallax images included in the element images 24 from respective observing point positions m (m2, m1) of a left eye 18A and a right eye 18B. As a result of displaying images with different parallaxes to the left eye 18A and the right eye 18B of the viewer 18, the viewer 18 can observe a three-dimensional image.

Note that light emitted from each pixel of each element image 24 is emitted in a predetermined direction via the light beam controller 22. There are cases, however, where light emitted from each pixel of each element image 24 is emitted in a direction different from the predetermined direction. Thus, there are cases where light beams emitted from pixels with the same parallax number in the element images 24 of the three-dimensional image displayed on the display device 14 are emitted in different directions and variation occurs in the entire display area of the display device 14.

Figure 4A:
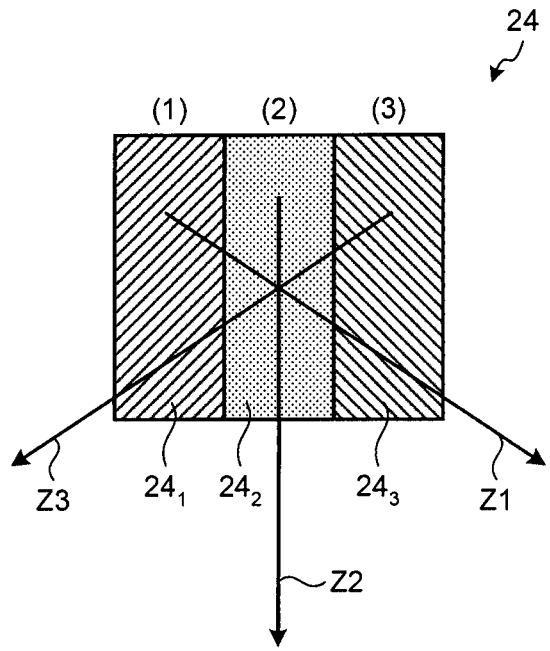
FIGS. 4A and 4B are diagrams for explaining directions of light beams emitted from pixels of an element image.
Figure 4B:
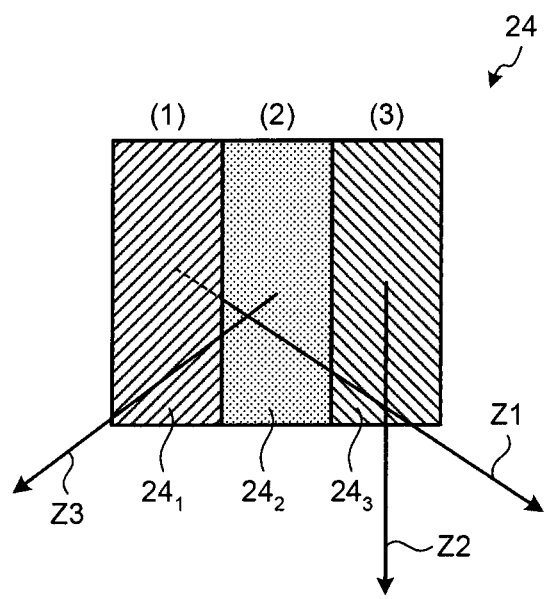

FIGS. 4A and 4B are diagrams for explaining the directions of light beams emitted from the pixels of each element image 24. FIG. 4A illustrates a case where light beams emitted from the pixels ($24_1$ to $24_3$) of each element image 24 are emitted in predetermined directions.

As illustrated in FIG. 4A, in a predetermined state, for example, a light beam emitted from the pixel $24_3$ with the parallax number 3 in an element image 24 is emitted in the direction of the arrow Z3 via the light beam controller 22. A light beam emitted from the pixel $24_2$ with the parallax number 2 in the element image 24 is emitted in the direction of the arrow Z2 via the light beam controller 22. In addition, a light beam emitted from the pixel $24_1$ with the parallax number 1 in the element image 24 is emitted in the direction of the arrow Z1 via the light beam controller 22.

FIG. 4B is a schematic diagram illustrating a case where light beams emitted from the pixels ($24_1$ to $24_3$) of each element image 24 are emitted in directions different from the predetermined directions. As illustrated in FIG. 4B, there may be cases where a light beam emitted from the pixel $24_3$ with the parallax number 3 in an element image 24 is emitted in the direction of the arrow Z2 instead of the direction of the arrow Z3 via the light beam controller 22. There may also be cases where a light beam emitted from the pixel $24_2$ with the parallax number 2 in an element image 24 is emitted in the direction of the arrow Z3 instead of the direction of the arrow Z2 via the light beam controller 22.

Such variation in the directions of light beams emitted from the pixels of each element image 24 is considered to be caused by the following factors, for example. Examples of the factors include distortion of the display area of the display device 14, aged deterioration of the display device 14 and non-uniformity in a gap between the display panel 20 and the light beam controller 22. If aged deterioration of the display device 14 occurs, parts of the display panel 20 and the light beam controller 22 may be removed or the gap between the display panel 20 and the light beam controller 22 may become non-uniform.

As a result, the directions of light beams emitted from pixels with the same parallax number in the element images 24 may vary over the entire display area of the display device 14.

When such variation occurs, a three-dimensional image in good condition can be observed in some regions of the display device 14 but a three-dimensional image cannot be observed in other regions.

This phenomenon will be further described in detail.

Figure 5:
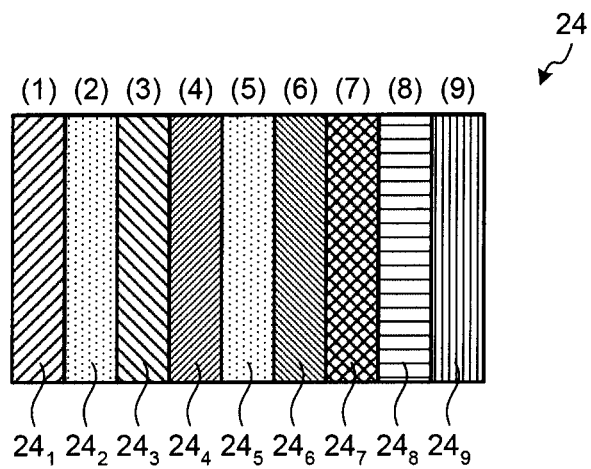
FIG. 5 is a schematic diagram illustrating pixels constituting an element image.

FIG. 5 is a schematic diagram illustrating pixels ($24_1$ to $24_9$) constituting an element image 24 in a case where the number of parallaxes is nine. The pixels ($24_1$ to $24_9$) are pixels of parallax images identified by the parallax numbers 1 to 9, respectively.

Figure 6A:
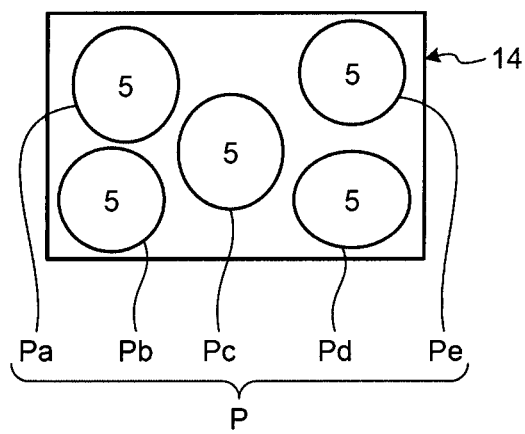
FIGS. 6A and 6B are schematic diagrams in a case where the light beam directions are uniform.
Figure 6B:
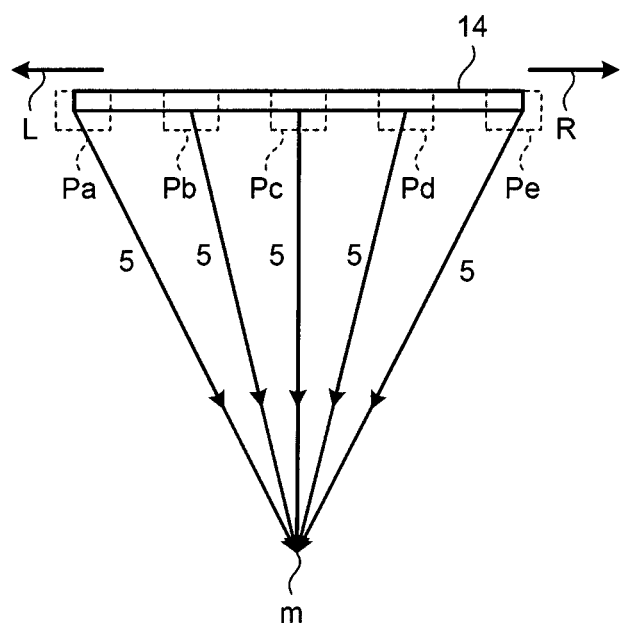

FIGS. 6A and 6B are diagrams illustrating a case where the directions of light beams emitted from pixels with the same parallax number are uniform when the number of parallaxes is nine. Uniform light beam directions mean that the directions of light beams emitted from pixels with the same parallax number in the element images 24 correspond to a predetermined direction. More specifically, uniform light beam directions mean that pixels of parallax images identified by the same parallax number are observed among regions P from an observing point position (one eye).

The regions P refer to a plurality of regions P into which the display area for a three-dimensional image in the display device 14 is divided. The dividing method used for dividing the display area for a three-dimensional image in the display device 14 may be set in advance. For example, regions corresponding to the element images 24 in the display device 14 may be the regions P, respectively, or one region P may be set for a plurality of element images 24. In this embodiment, description will be made assuming that regions corresponding to the element images 24 in the display area for a three-dimensional image in the display device 14 are a plurality of regions P, respectively, into which the display area for a three-dimensional image in the display device 14 is divided.

The observing point position represents the position of the viewer who views a three-dimensional image. More specifically, the observing point position represents the position of one eye of the viewer.

FIG. 6A is a diagram illustrating parallax numbers of parallax images observed in the regions P (Pa to Pe) of the display area of the display device 14 from an observing point position in a case where the light beam directions are uniform. It is assumed that parallax images to be observed from the observing point position m are those with the parallax number 5. In this case, if the viewer views the display device 14 from the observing point position m with one eye, the viewer can observe parallax images with the parallax number 5 over all the regions of the display device 14 as illustrated in FIG. 6A.

Specifically, light from the pixels of the parallax images with the parallax number 5 in the display device 14 enters the observing point position m from the regions Pa to Pe as illustrated in FIG. 6B. Similarly, if the viewer views the display device 14 with the other eye, the viewer can observe parallax images with the parallax number 3 (not illustrated), for example, as parallax images with the parallax number to be observed. Thus, if the viewer views the display device 14 with both eyes when the light beam directions are uniform, a three-dimensional image can be observed along line of sight shifted to any of a plurality of regions P into which the entire area of the display device 14 is divided.

Figure 7A:
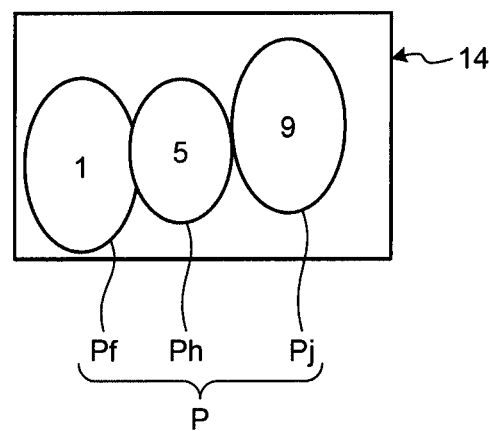
FIGS. 7A and 7B are schematic diagrams in a case where the light beam directions are non-uniform.
Figure 7B:
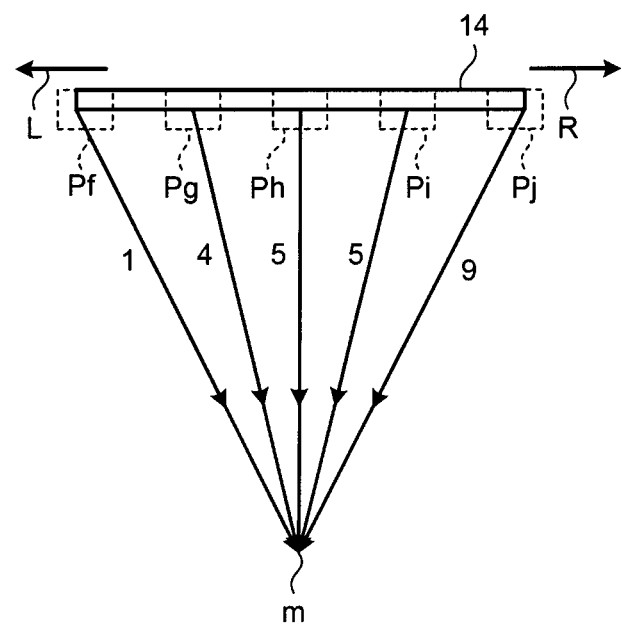

FIGS. 7A and 7B are schematic diagrams illustrating a case where the directions of light beams emitted from pixels with the same parallax number are non-uniform when the number of parallaxes is nine. Non-uniform light beam directions mean that the directions of light beams emitted from pixels with the same parallax number in the element images 24 include directions different from the predetermined direction. More specifically, non-uniform light beam directions mean that pixels of parallax images identified by different parallax numbers are observed among regions P from an observing point position (one eye).

FIG. 7A is a diagram illustrating parallax numbers of parallax images observed in the regions P (Pf to Pj) of the display area of the display device 14 from an observing point position in a case where the light beam directions are non-uniform. It is assumed that parallax images to be observed from the observing point position m are those with the parallax number 5. In this case, if the viewer views the display device 14 from the observing point position m with one eye when the light beam directions are non-uniform, the viewer will observe parallax images with different parallax numbers among the regions. For example, there will be a region Ph where the parallax number 5 is observed, a region Pf where the parallax number 1 is observed and a region Pj where the parallax number 9 is observed as illustrated in FIG. 7A.

Specifically, light from the pixels of the parallax images with the different parallax numbers (1, 4, 5 and 9) enters the observing point position m from the regions Pf to Pj as illustrated in FIG. 7B. Thus, if the viewer views the display device 14 with both eyes when the light beam directions are non-uniform, there will occur regions where a three-dimensional image can be observed and regions where a three-dimensional image cannot be observed (pseudoscopic regions) depending on the regions P of the display device 14.

As described above, the directions of light beams emitted from the pixels of the parallax images in the element images 24 contained in the regions P of the display device 14 may be different from expected directions owing to distortion of the display device 14 or the like. In such case, parallax images with parallax numbers that are different from those of parallax images to be observed from an observing point position are observed, the resulting entire screen is not a normal viewing zone, and thus a stereoscopic vision cannot be obtained. For this reason, there are cases where regions P in which a three-dimensional image can be observed and regions P in which a three-dimensional image cannot be observed are generated in the display area of the display device 14.

In this embodiment, therefore, the image processing device 12 corrects the pixels at a position corresponding to a region P to be corrected among the parallax images to pixels to be observed on the basis of the observing point position and the parallax numbers (identification information) of the parallax images of the pixels to be observed at the pixels of a plurality of regions P into which the display device 14 is divided from the observing point position. Then, a three-dimensional image generated from the parallax images resulting from the correction is displayed on the display device 14.

In this manner, the image processing device 12 of this embodiment can make a screen a normal viewing zone.

The image processing device 12 according to this embodiment will be described in detail below.

Figure 8:
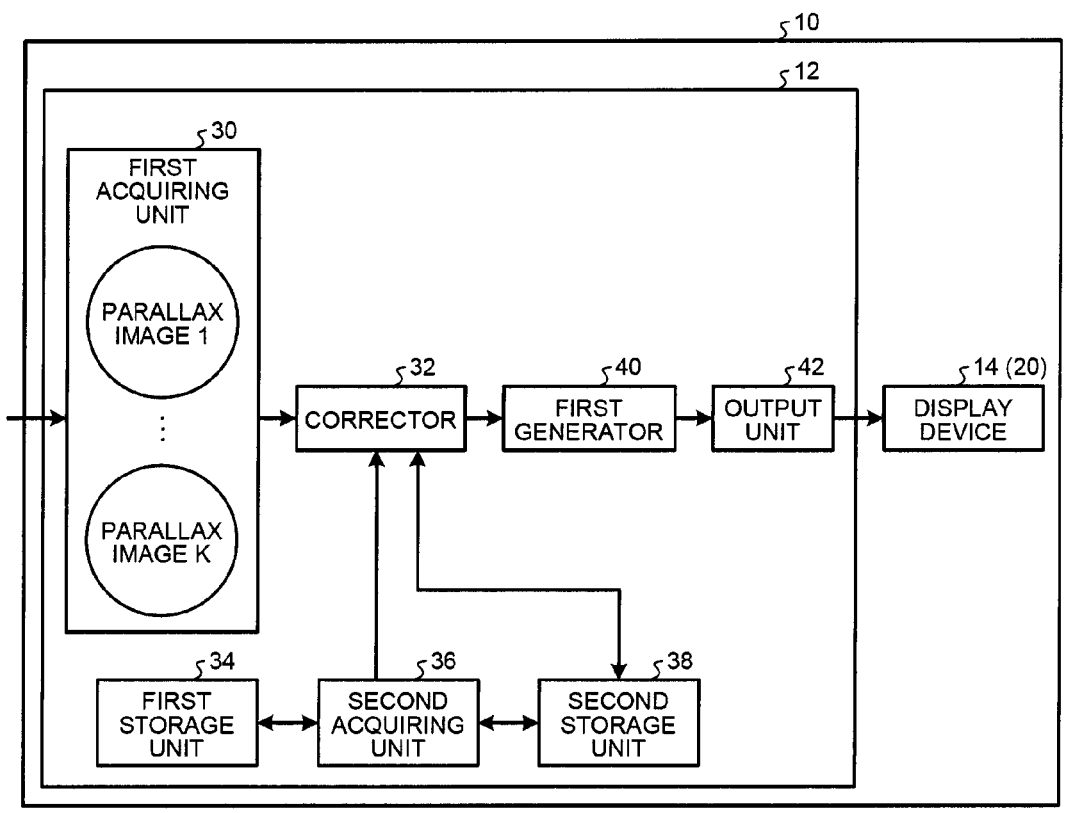
FIG. 8 is a block diagram of an image processing device according to the first embodiment.

FIG. 8 is a block diagram illustrating the image processing device 12. The image processing device 12 includes a first acquiring unit 30, a corrector 32, a first storage unit 34, a second acquiring unit 36, a second storage unit 38, a first generator 40 and an output unit 42.

The first acquiring unit 30 acquires a plurality of (K (K is an integer of 2 or larger)) parallax images used for a three-dimensional image. The first acquiring unit 30 outputs the acquired parallax images to the corrector 32.

The first storage unit 34 stores a first parallax number representing a parallax number of a parallax image to be observed from the observing point position in association with each region P and the observing point position. The observing point position represents the position of the viewer in the real space as described above. More specifically, the observing point position represents the position of an eye (that is, one eye) of the viewer in this embodiment. The observing point position refers to three-dimensional position coordinates in the real space. The first storage unit 34 also stores a position of each region P in the display area of the display device 14 as the region P.

The first parallax number represents a parallax number of a parallax image to be observed when an associated region P is viewed from an associated observing point position. In the image display apparatus 10, the first parallax numbers associated with the positional relations between the observing point positions and the regions P are stored in advance in the first storage unit 34. The first parallax numbers associated with the observing point positions and the regions P may be obtained in advance through experiments or simulations and stored in the first storage unit 34.

The second storage unit 38 stores in advance an observing point position that is a position of one eye of the viewer. The observing point position may be one given position (three-dimensional position coordinates) in the real space from which the display device 14 can be viewed. Although a case where one observing point position is stored in advance is described in this embodiment, a plurality of observing point positions may be stored.

Moreover, although a case where the observing point position is stored in advance is described in this embodiment, the observing point position may be read from an external device. Alternatively, a detecting unit (not illustrated) may be provided in the image display apparatus 10 and the observing point position may be obtained from the detector that detects the position of an eye of the viewer. A camera, a sensor or the like is used as the detecting unit. The detecting unit may detect the observing point position by detecting at least three-dimensional position coordinates of the left eye or three-dimensional position coordinates of the right of the viewer in the real space.

The second acquiring unit 36 acquires a first parallax number associated with the observing point position of the viewer and a region P to be corrected from the first storage unit 34. Specifically, the second acquiring unit 36 acquires from the first storage unit 34 the parallax number of a pixel to be observed in a region P to be corrected from the observing point position.

Note that the first storage unit 34 stores regions P in association with the same parallax number as the first parallax number of parallax images to be observed in the regions P from one observing point position. Thus, the second acquiring unit 36 preferably acquires the same parallax number among the regions as the first parallax number of the parallax images to be observed in the regions P from an observing point position.

The corrector 32 corrects pixels at a position corresponding to a region P in the parallax images obtained from the first acquiring unit 30 to pixels of the parallax images identified by the first parallax numbers on the basis of the observing point position and the first parallax numbers of the parallax images to be observed in the pixels of the region P from the observing point position.

The corrector 32 then outputs the parallax images (corrected parallax images) resulting from the correction to the first generator 40. The first generator 40 generates a three-dimensional image from a plurality of corrected parallax images and outputs the three-dimensional image to the output unit 42. The output unit 42 displays the three-dimensional image received from the first generator 40 on the display panel 20 of the display device 14.

The first acquiring unit 30, the corrector 32, the second acquiring unit 36, the first generator 40 and the output unit 42 are implemented by a central processing unit (CPU). The first storage unit 34 and the second storage unit 38 are implemented by a storage medium such as a memory used in the CPU and a hard disk drive (HDD).

Next, a process of correcting parallax images by the corrector 32 will be described in detail.

The corrector 32 specifies one region P to be corrected from all of a plurality of regions P into which the display area of the display device 14 is divided. The position coordinates of each region P of the display device 14 is represented by $(i, j)^T$. T represents a transpose. i is a coordinate (or may be an index) in a first direction of the display device 14. j is a coordinate (or may be an index) in a second direction of the display device 14. Common coordinates $(i, j)$ are used for all the parallax images.

Note that an element image 24 contained in position coordinates $(i, j)^T$ of the region P includes a group of pixels of parallax images where the number of parallaxes is K (K is an integer of 1 or larger). Thus, the pixel group $y(i, j)$ in each region P before correction can be expressed by the following expression (1):

$$y(i,j)=(y_1(i,j), \ldots, y_K(i,j))^T \qquad (1).$$

In the expression (1), subscripts ($_1$ to $_K$) of $y_1$ to $Y_K$ represent parallax numbers. K represents the number of parallaxes. $y(i, j)$ represents the group of pixels with the parallax numbers constituting one region P (element image 24) in a three-dimensional image generated from the parallax images acquired by the first acquiring unit 30. $y_1(i, j)$ represents a pixel value at coordinates $(i, j)$ in the parallax image with the parallax number 1. In the expression (1), ", . . . ," represents pixel values at coordinates $(i, j)$ in the parallax images with the parallax numbers where the value of K is equal to or larger than 2 but smaller than K−1 in the expression (1). Similarly, $y_K(i, j)$ represents a pixel value at coordinates $(i, j)$ in the parallax image with the parallax number K. Thus, $y(i, j)$ represents pixel values in one region P (element image 24) in the three-dimensional image generated from parallax images (parallax images before correction) acquired by the first acquiring unit 30.

The corrector 32 corrects a pixel value at coordinates $(i, j)$ in a parallax image with each parallax number by using position coordinates $(i, j)^T$ of the region P and a pixel $L(i, j)$ of a parallax image with the first parallax number $k_{dst}$ to be observed associated with the observing point position.

Specifically, the corrector 32 first obtains a correction value c for correcting pixel values $(y_1(i, j)$ to $y_K(i, j))$ at coordinates $(i, j)$ in the parallax images by using the following expression (2):

$$c=k_{dst}-L(i,j) \qquad (2).$$

The corrector 32 then corrects each of the pixel values $(y_1(i, j)$ to $y_K(i, j))$ in the expression (1) to a pixel value at the same position coordinates in a parallax image with the parallax number k' represented by the following expression (2A) by using the correction value c calculated by the expression (2):

$$k'=\mathrm{mod}(k+c,K) \qquad (2A).$$

In the expression (2A), k represents the parallax number before the correction. K represents the number of parallaxes. c is expressed by the expression (2) described above. k' represents the parallax number after the correction.

Thus, the corrector 32 obtains, as the parallax number after the correction, k' that is the remainder when a value obtained by adding the correction value c to the parallax number k is divided by the number K of parallaxes. Then, the corrector 32 corrects the pixels of the parallax images at a position corresponding to the region P to the pixels of the parallax images identified by the parallax number after the correction.

Thus, the pixel group x(i, j) in each region P after the correction can be expressed by the following expression (3):

$$x(i,j)=(x_1(i,j), \ldots, x_K(i,j))^T \quad (3).$$

In the expression (3), subscripts ($_1$ to $_K$) of $x_1$ to $x_K$ represent parallax numbers after the correction. Thus, the subscripts ($_1$ to $_K$) of $x_1$ to $x_K$ in the expression (3) are parallax numbers resulting from correcting the parallax numbers represented by the subscripts ($_1$ to $_K$) of $y_1$ to $y_K$ in the expression (1) that are the parallax numbers before the correction by using the expression (2A) described above.

In addition, in the expression (3), K represents the number of parallaxes. x(i, j) represents the group of pixels constituting one region P (element image 24) in the three-dimensional image generated from the parallax images after the correction. $x_1$(i, j) represents a pixel value after the correction at coordinates (i, j) in the parallax image with the parallax number 1. In the expression (3), ", . . .," represents pixel values after the correction at coordinates (i, j) in the parallax images with the parallax numbers where the value of K is equal to or larger than 2 but smaller than K−1 in the expression (3). Similarly, $x_K$(i, j) represents a pixel value after the correction at coordinates (i, j) in the parallax image with the parallax number K. Thus, x(i, j) represents pixel values in one region P (element image 24) in the three-dimensional image generated from the corrected parallax images resulting from the correction by the corrector 32.

As described above, the image processing device 12 of this embodiment corrects parallax images acquired by the first acquiring unit 30 so that pixels of parallax images with the first parallax numbers to be observed from the observing point position are observed at the respective pixels of a plurality of regions P into which the display device 14 is divided. In other words, the corrector 32 modifies the arrangement of the pixel group of a plurality of parallax images constituting an element image 24 in each region P so that pixels of the parallax images with the first parallax numbers to be observed are displayed. Accordingly, the image processing device 12 rotates the viewing zone so that the expected viewing zone is formed in each regions P.

Figure 9:
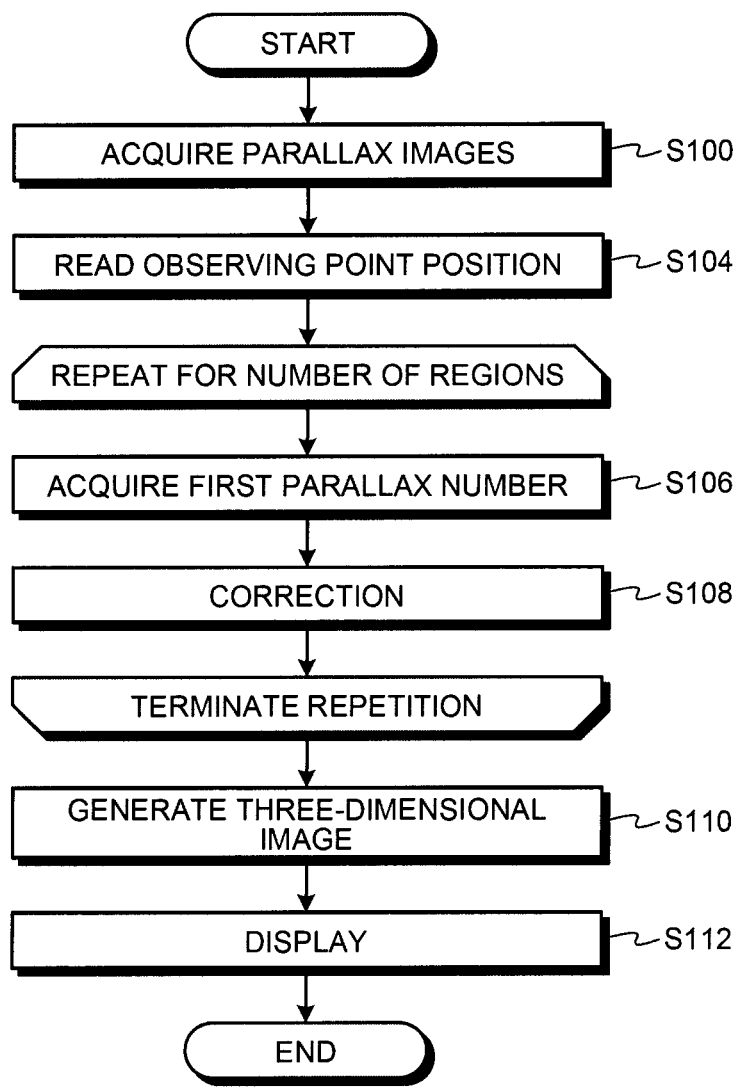
FIG. 9 is a flowchart illustrating procedures of image processing according to the first embodiment.

Next, procedures of image processing performed by the image processing device 12 will be described. FIG. 9 is a flowchart illustrating procedures of image processing performed by the image display apparatus 10 according to this embodiment.

First, the first acquiring unit 30 acquires a plurality of parallax images (step S100). Next, the corrector 32 reads the observing point position stored in the second storage unit 38 (step S104).

Next, the image processing device 12 repeats the processes in the following steps S106 to S108 the number of times corresponding to the predetermined number of the regions P into which the display device 14 is divided.

First, the second acquiring unit 36 acquires the first parallax number associated with the observing point position of the viewer read in step S104 described above and a region P to be corrected from the first storage unit 34 (step S106). As a result of the process in step S106, the second acquiring unit 36 acquires the parallax numbers of pixels to be observed in the region P to be corrected from the observing point position.

Next, the corrector 32 performs the correction process (step S108). Specifically, the corrector 32 corrects pixels at a position corresponding to the region P to be corrected in the parallax images acquired in step S100 described above to pixels of the first parallax number to be observed on the basis of the observing point position obtained in step S104 and the first parallax number acquired in step S106 described above.

As a result of performing the processes in steps S106 to S108 for all of a plurality of regions P in the display device 14, the parallax images obtained from the first acquiring unit 30 are corrected to generate corrected parallax images.

Next, the first generator 40 generates a three-dimensional image from the corrected parallax images (step S110). Next, the output unit 42 displays the three-dimensional image generated in step S110 on the display panel 20 (step S112), and this routine is terminated.

Figure 10:
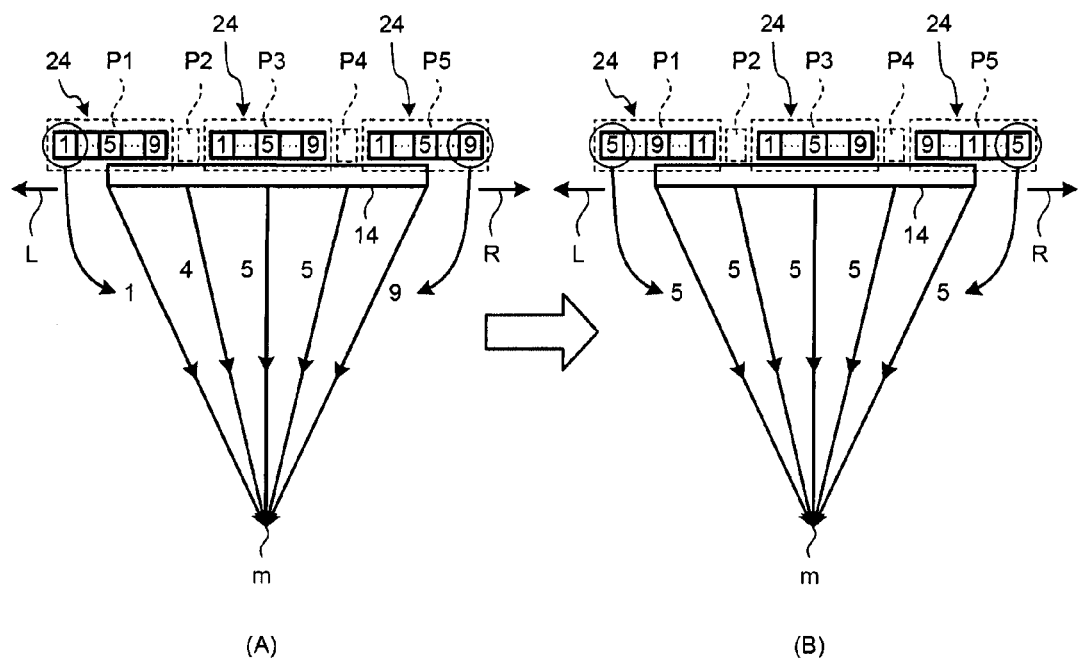
FIG. 10 is a schematic diagram illustrating correction of parallax images.

FIG. 10 is a schematic diagram illustrating correction of the parallax images acquired by the first acquiring unit 30.

FIG. 10(A) is a schematic diagram illustrating pixels with the parallax numbers observed in the regions P (P1 to P5) from the observing point position m when the three-dimensional image generated from the parallax images acquired by the first acquiring unit 30 is displayed. As illustrated in FIG. 10(A), if the viewer views the display device 14 from an observing point position m with one eye when the light beam directions are non-uniform, the viewer will observe parallax images with different parallax numbers among the regions P of the display device 14.

Specifically, it is assumed that an element image 24 in each of the regions P1 to P5 of the display device 14 includes a series of pixels of parallax images with parallax numbers 1 to 9 as illustrated in FIG. 10(A). Then, if the regions P1 to P5 are viewed from the observing point position when the light beam directions from the pixels of each element image 24 of the display device 14 are non-uniform, pixels of the following pixel numbers are observed. For example, a pixel with the parallax number 1 is observed in the region P1, a pixel with the parallax number 4 is observed in the region P2, and a pixel with the parallax number 5 is observed in the region P3 from the observing point position m. Similarly, a pixel with the parallax number 5 is observed in the region P4 from the observing point position m, and a pixel with the parallax number 9 is observed in the region P5 from the observing point position m.

Meanwhile, in the image processing device 12 of this embodiment, the corrector 32 corrects pixels at a position corresponding to a region P to be corrected in the parallax images acquired by the first acquiring unit 30 to pixels with the first parallax numbers to be observed on the basis of the observing point position m and the first parallax numbers as described above.

It is assumed here that pixels to be observed in the regions P (P1 to P5) from the observing point position are pixels with the parallax number 5. In this case, as a result of performing the above-described image processing by the image processing device 12 according to this embodiment, the pixels of the parallax images are corrected so that the parallax number of the pixels observed in the regions P1 to P4 from the observing point position m becomes the parallax number 5.

Thus, when a three-dimensional image using the corrected parallax images resulting from the correction is displayed on the display device 14, a state in which the viewing zones have been rotated so that the pixels with the parallax number 5 are observed in the regions P1 to P4 from the observing point position m is obtained (see FIG. 10(B)). As a result, light from the pixels with the parallax number 5 reaches the observing point position m from the regions P (P1 to P5).

As described above, the entire screen can be made a normal viewing zone from an observing point position by correcting pixels at positions corresponding to the regions P in the parallax images so that pixels with the first parallax number to be observed are observed from the observing point position m.

As described above, the image processing device 12 of this embodiment corrects the parallax images so that pixels of parallax images with the predetermined first parallax number to be observed from the observing point position are observed at the pixels in a plurality of regions P into which the display device 14 is divided. Then, a three-dimensional image is generated from corrected parallax images resulting from the correction and displayed on the display device 14. The entire screen can therefore be made a normal viewing zone and an image thereon can be observed stereoscopically even in a case of a sheet display or where part of the display area is deformed or removed because of aged deterioration.

The first acquiring unit 30 may alternatively generate parallax images from one image input thereto. Still alternatively, the first acquiring unit 30 may generate parallax images from stereo images input thereto. The parallax images may be any images each containing a region having a parallax from one another. In other words, the parallax images may contain regions having the same parallax.

Second Embodiment

In the first embodiment, description has been made on a case where parallax images acquired by the first acquiring unit 30 are corrected so that pixels of parallax images with the first parallax number to be observed are observed in the regions P of the display device 14 and a three-dimensional image is generated from the corrected parallax images resulting from the correction.

In the second embodiment, description will be made on a case where parallax images are corrected on the basis of the first parallax number and luminance distribution associated with positional relations between the observing point position and regions P.

The luminance distribution refers to angular distribution of the luminance of light beams emitted from the regions P of the display device 14. The angle refers to an angle in a first direction (horizontal direction) or an angle in a second direction (vertical direction), for example. Although a case where the angle is an angle in the second direction will be described in this embodiment, the angle may be an angle in the first direction or an angle in both of the first and second directions.

Figure 11:
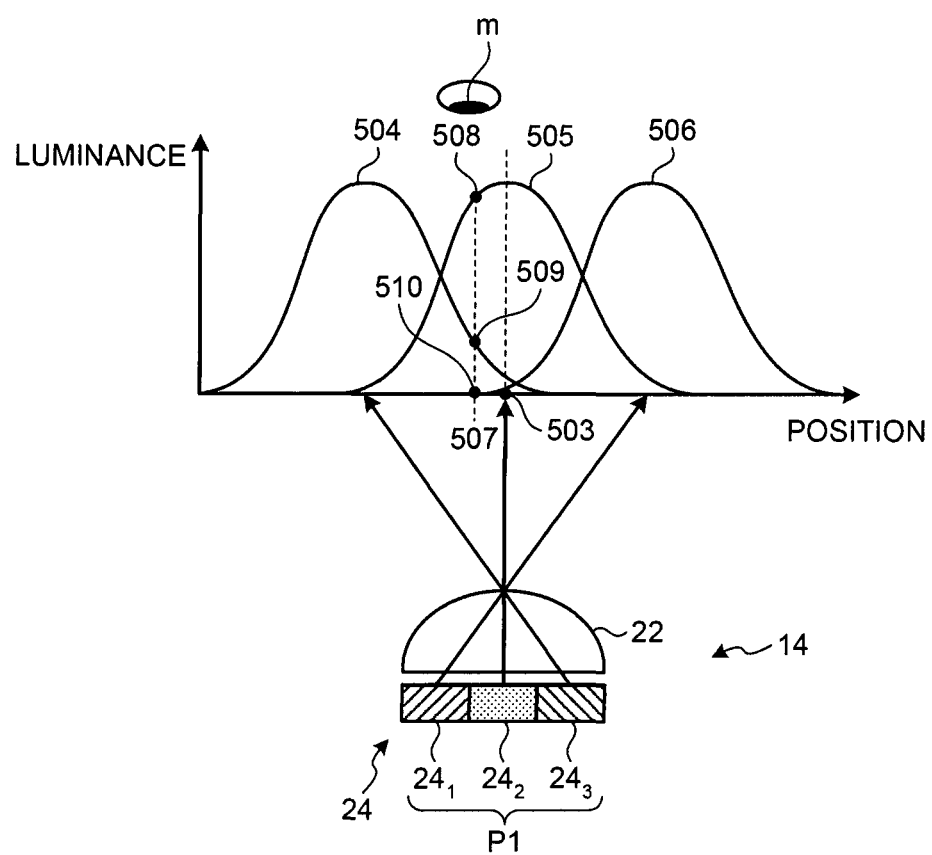
FIG. 11 is a diagram illustrating luminance distribution of pixels of an element image.

Light reaching one eye at an observing point position will be described here. FIG. 11 is a diagram illustrating luminance distribution of light beams emitted from an element image 24 in a region P.

FIG. 11 illustrates a case where one element image 24 where the number of parallaxes is 3, that is, one element image 24 containing a pixel $24_1$ with the parallax number 1, a pixel $24_2$ with the parallax number 2 and a pixel $24_3$ with the parallax number 3 is arranged in a region P1 of the display device 14 with respect to an optical opening in the light beam controller 22.

As illustrated in FIG. 11, light emitted from each pixel (each of the pixels $24_1$ to $24_3$) is emitted via the light beam controller 22. Since light beams emitted via the light beam controller 22 are diffused, the luminance of the light beams measured at positions at a certain distance from the light beam controller 22 is distributed within a certain range as illustrated in FIG. 11. Note that the horizontal axis represents the position, the vertical axis represents the intensity, the luminance distribution of the pixel $24_1$ is denoted by 506, the luminance distribution of the pixel $24_2$ is denoted by 505 and the luminance distribution of the pixel $24_3$ is denoted by 504.

Light reaching one eye when the region P1 in the display device 14 is viewed from a certain observing point position is distributed according to the luminance distribution. In other words, light reaching the observing point position m is an overlay (color mixture, for example) of pixel values of the pixels $24_1$ to $24_3$. For example, light reaching the eye at the observing point position m when the region P1 is viewed from a position 507 is a weighted sum of luminance values of the pixels $24_1$, $24_2$ and $24_3$ using values 508, 509 and 510 of the luminance distributions at the position 507 as weights.

When the observing point position m is at a position 503 where only a light beam from the pixel $24_2$ can be selectively observed, the pixel that can be observed from the observing point position m is the pixel $24_2$ with the parallax number 2. When the observing point position m is at a position 507 where both of light beams from the pixels $24_2$ and $24_1$ can be observed, however, the pixels that can be observed from the observing point position m are both of the pixel $24_2$ with the parallax number 2 and the pixel $24_1$ with the parallax number 1.

Accordingly, when the viewer views the display device 14 with one eye at the position 507 as the observing point position m, an overlay image in which the pixels of a plurality of parallax images are overlaid according to the luminance distribution at the observing point position is observed, and multiple blurring occurs. In other words, when the same region P is viewed from an observing point position m with a different observing angle, a parallax image with a parallax number different from the parallax number to be observed may be observed depending on the luminance distribution at the observing point position m.

In an image display apparatus of this embodiment, therefore, the luminance of pixels at a position corresponding to each region P in the parallax images is corrected to the luminance of pixels in the parallax images with the first parallax number to be observed on the basis of the first parallax number and the luminance distribution associated with the positional relations between the observing point position and the regions P.

Figure 12:
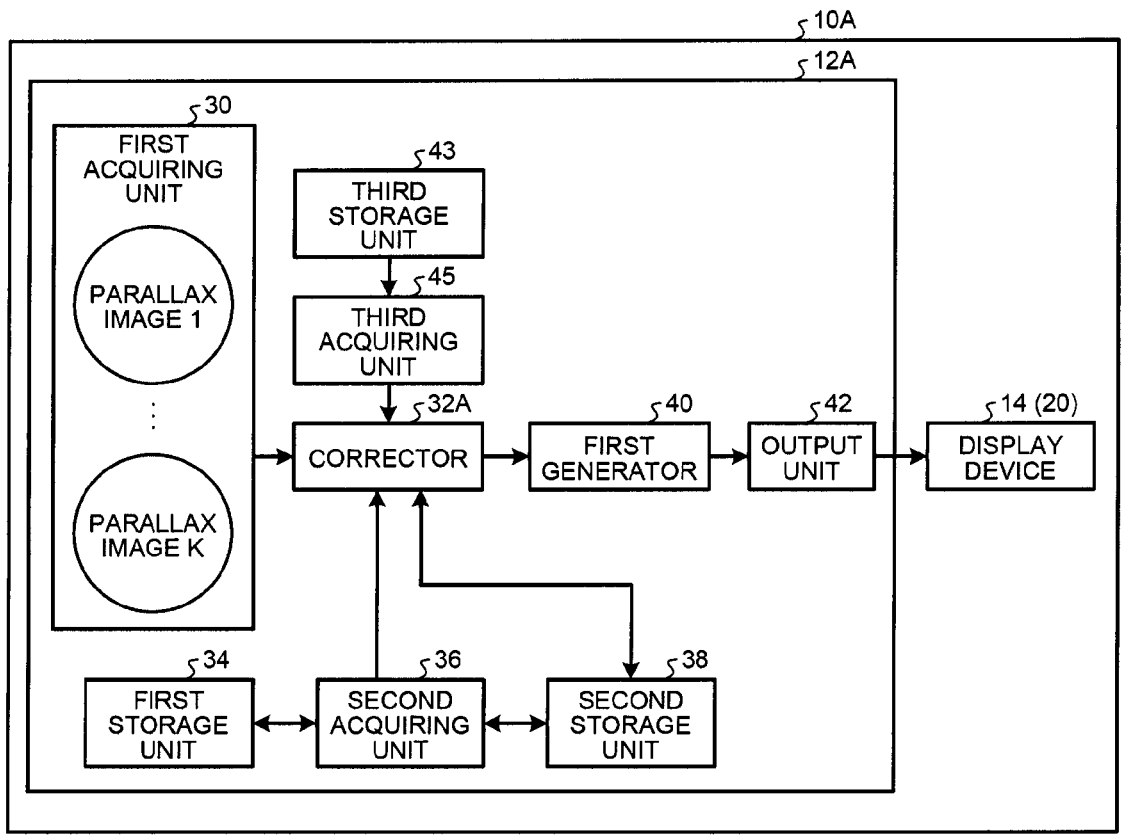
FIG. 12 is a block diagram of an image processing device according to a second embodiment.

FIG. 12 is a block diagram illustrating an image display apparatus 10A according to this embodiment. The image display apparatus 10A includes an image processing device 12A and a display device 14.

The image processing device 12A includes a first acquiring unit 30, a corrector 32A, a third storage unit 43, a third acquiring unit 45, a first generator 40, an output unit 42, a first storage unit 34, a second acquiring unit 36 and a second storage unit 38. Since the first acquiring unit 30, the first storage unit 34, the second acquiring unit 36, the second storage unit 38, the first generator 40 and the display device 14 are similar to those in the first embodiment, the description thereof will not be repeated.

The third storage unit 43 stores luminance distribution for each angle θ of the display device 14. The angle θ represents an angle θ of the observing point position from which the viewer views a region P. In other words, the angle θ is an angle between the observing point position that is a position of one eye of the viewer and a region P in the display device 14. In this embodiment, the luminance distribution is represented by H. The luminance distribution H is expressed by the following expression (4):

$$H = \begin{bmatrix} h_1(\theta_0) & \cdots & h_K(\theta_0) \\ \vdots & & \vdots \\ h_1(\theta_Q) & \cdots & h_K(\theta_Q) \end{bmatrix}. \quad (4)$$

In the expression (4), $h_K(\theta)$ represents the luminance in the direction of the angle θ of the light beams emitted from pixels displaying the parallax number K. The angles $\theta_0$ to $\theta_Q$ may be determined in advance through experiments or simulations. K is an integer equal to or larger than 1 but equal to or smaller than the number of parallaxes. In addition, in the expression (4), a row direction represents the luminance of the same angle θ. In the expression (4), a column direction represents luminances of pixels with the respective parallax numbers.

Figure 13:
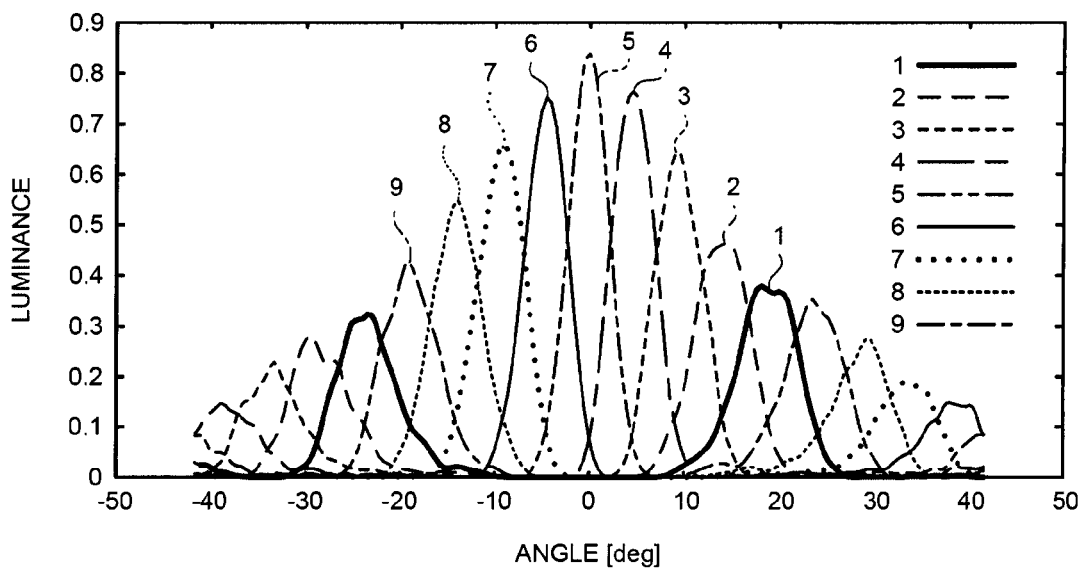
FIG. 13 is a graph illustrating an example of luminance distribution.

FIG. 13 is a graph illustrating an example of the luminance distribution of a region P. FIG. 13 illustrates the luminance distribution corresponding to nine parallaxes. The luminance distribution illustrated in FIG. 13 includes distribution of luminances of light beams emitted from the pixels (pixels with the parallax numbers 1 to 9, for example) in an element image 24 in a region P of a three-dimensional image displayed on the display device 14 that is illustrated for each parallax number. The horizontal axis represents the angle (the angle in a first direction, for example) with respect to the region P. The vertical axis represents the luminance. The lines denoted by numbers 1 to 9 in FIG. 13 represent the luminance distribution corresponding to the pixels with the parallax numbers 1 to 9, respectively.

In the luminance distribution illustrated in FIG. 13, the direction exactly in front of the region P is defined as an angle 0 (deg.). The vertical axis represents the luminance (the intensity of light beams). The luminance distribution may be measured in advance for each region P by using a luminance meter or the like.

Figure 14A:
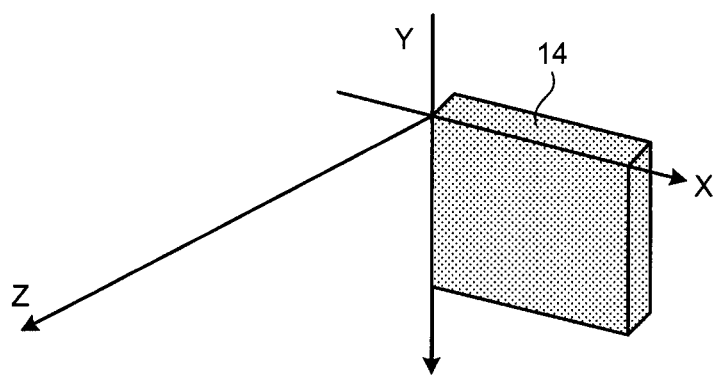
FIGS. 14A and 14B are diagrams illustrating a positional relation between a display device and an observing point position m.
Figure 14B:
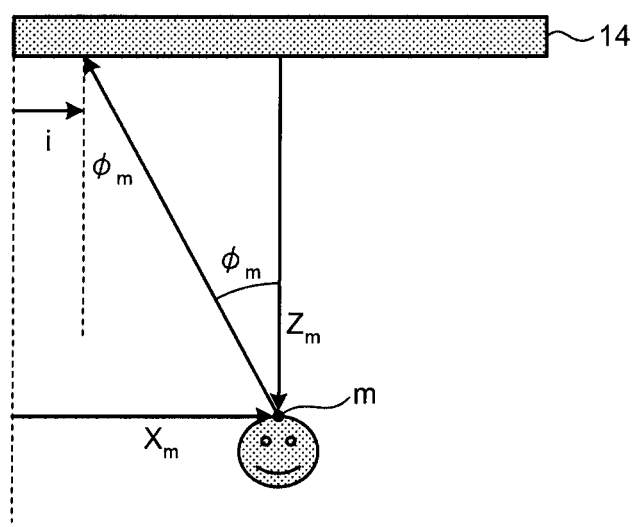

FIGS. 14A and 14B are explanatory diagrams illustrating a positional relation between the display device 14 and the observing point position m. As illustrated in FIG. 14A, an origin is set on the display device 14 (a point on the upper-left of the display device 14, for example). An X-axis is set in the first direction passing through the origin. A Y-axis is set in the second direction passing through the origin. A Z-axis is set in a direction perpendicular to the first and second directions passing through the origin. Z represents a distance from the display device 14 to the observing point position m.

As illustrated in FIG. 14B, the observing point position of the viewer is expressed as m=$(X_m, Y_m, Z_m)^T$. In this embodiment, the observing point m is defined in advance. A plurality of observing point positions m may be used. When a region P at coordinates $(i, j)^T$ is viewed from the observing point position m, an angle $\phi_m$ between the viewing direction and the Z direction can be expressed by an expression (5):

$$\phi_m = \tan^{-1}\left(\frac{X_m - i}{Z_m}\right). \tag{5}$$

In the expression (5), m represents a number representing each of the observing point positions, and is an integer equal to or larger than 1 but equal to or smaller than the number of observing point positions.

Accordingly, when the region P at coordinates $(i, j)^T$ is viewed from an observing point position m, the luminance $h^{(i,j)}(\phi_m)$ of a light beam travelling in the direction of the angle $\phi_m$ from the region P can be expressed by an expression (6):

$$h^{(i,j)}(\phi_m)=(h_1^{(i,j)}(\phi_m), \ldots, h_K^{(i,j)}(\phi_m)) \tag{6}$$

The description is continued referring back to FIG. 12.

The third acquiring unit 45 acquires the luminance distribution corresponding to the positional relation between each region P and the observing point position from the third storage unit 43.

The corrector 32A corrects the luminance of pixels at a position corresponding to each region P in the parallax images to the luminance of pixels of parallax images identified by a first identification number that is a parallax number to be observed in the region P on the basis of the luminance distribution corresponding to the positional relation between each region P and the observing point position.

The corrector 32A then outputs the parallax images (corrected parallax images) resulting from the correction to the first generator 40. The first generator 40 generates a three-dimensional image from a plurality of corrected parallax images and outputs the three-dimensional image to the output unit 42. The output unit 42 displays the three-dimensional image received from the first generator 40 on the display panel 20 of the display device 14.

The first acquiring unit 30, the corrector 32A, the second acquiring unit 36, the first generator 40, the third acquiring unit 45 and the output unit 42 are implemented by a central processing unit (CPU). The first storage unit 34, the second storage unit 38 and the third storage unit 43 are implemented by a storage medium such as a memory used in the CPU and a hard disk drive (HDD).

Next, correction of parallax images by the corrector 32A will be described in detail.

In this embodiment, a case in which each region P contains one element image 24 will be described similarly to the first embodiment.

The corrector 32A sequentially specifies one region P to be corrected from all of a plurality of regions P into which the display area of the display device 14 is divided. As described in the first embodiment, an element image 24 contained in position coordinates $(i, j)^T$ of the region P includes a group of pixels of parallax images where the number of parallaxes is K (K is an integer of 1 or larger). Thus, the pixel group y(i, j) in each region P before correction can be expressed by the expression (1) described above.

The corrector 32A then performs a correcting process based on the observing point position m, a first parallax number $k_{dst}$ to be observed according to the position coordinates $(i, j)^T$ of the region P and the luminance distribution H(i, j) of the region P.

Here, a pixel (pixel value) of a parallax image with the first parallax number $k_{dst}$ to be observed according to the position coordinates $(i, j)^T$ of the region P and the observing point position is represented by $L_m(i, j)$.

First, the corrector 32A corrects the parallax numbers corresponding to the pixels indicated by the luminance distribution H(i, j) of the region P on the basis of the first parallax number $k_{dst}$. Then, the parallax number k' resulting from the correction is expressed by the following expression (7):

$$k'=k+(k_{dst}-L_m(i,j)) \tag{7}$$

Note that a value at the center $k_c$ of the viewing zone expressed by the following expression (8) is preferably used as the first parallax number $k_{dst}$ to be observed. The center $k_c$ of the viewing zone represents the parallax number of the pixel to be observed at the center of each region P.

$$k_c=(K+1)/2 \tag{8}$$

In the expression (8), K represents the number of parallaxes.

Then, the expression (7) described above can be expressed by the following expression (9):

$$k'=k+(k_C-L_m(i,j)) \tag{9}$$

The corrector 32A then corrects each of the pixel values $(y_1(i, j)$ to $y_K(i, j))$ in y(i, j) (see the expression (1)) representing a pixel group of each region P before correction to pixel values at the same position coordinates in a parallax image with the parallax number k' represented by the expression (9).

In the expression (9), k represents the parallax number before the correction. K represents the number of parallaxes. k' represents the parallax number after the correction.

Thus, the corrector 32A uses k' as the parallax number resulting from the correction based on the first parallax number. Accordingly, the group of pixels x(i, j) of each region P after the correction based on the first parallax number is a value (see (3) described above) obtained by assigning k' in the expression (9) to k in the expression (1) described above.

The corrector 32A further corrects the luminance distribution corresponding to each region P by using the pixel group x(i, j) of each region P resulting from the correction based on the first parallax number. The corrector 32A then corrects the luminance of the pixels at a position corresponding to each region P in the parallax images to the luminance of pixels of parallax images identified by the first parallax number by using the corrected luminance distribution of each region P.

First, the corrector 32A corrects the luminance $h^{(i,j)}(\phi_m)$ of the light beams expressed by the expression (6) described above by the equation expressed by the following expression (10). Thus, the luminance $h^{(i,j)}(\phi_m)$ of light beams travelling from the region P in the direction of the angle $\phi_m$ corrected by the first parallax number at the position coordinates $(i, j)^T$ of the region P when the region P is viewed from the observing point position m is expressed by the following expression (10):

$$h^{(i,j)}(\phi_m) = (h_{1+(k_c-L_m(i,j))}(\phi_m), \ldots, h_{K+(k_c-L_m(i,j))}(\phi_m)) \quad (10).$$

The corrector 32A then extracts luminance distribution components (row components in the determinant of the expression (4)) corresponding to the angle $\phi_m$ ($\theta = \phi_m$) from the luminance distribution H(i, j) corresponding to the region P. If there are no luminance distribution components corresponding to the angle $\phi_m$ the corrector 32A may calculate the luminance distribution components by interpolation from other luminance distribution components ($\theta_0$ to $\theta_Q$). Alternatively, luminance distribution components at an angle $\theta$ that is closest to the angle $\phi_m$ may be extracted.

Next, the corrector 32A obtains a light beam luminance A(i, j) representing the luminance of a group of pixels y(i, j) in each region P before the correction in a case where each region P is viewed from each observing point position m by using the extracted luminance distribution components. The light beam luminance A(i, j) can be expressed by an expression (11):

$$A(i, j) = \begin{bmatrix} h_{1+(k_c-L_1(i,j))}(\phi_1) & \cdots & h_{K+(k_c-L_1(i,j))}(\phi_1) \\ & \ddots & \\ h_{1+(k_c-L_M(i,j))}(\phi_M) & \cdots & h_{K+(k_c-L_M(i,j))}(\phi_M) \end{bmatrix} \quad (11)$$

The matrix expressed by the expression (11) is a matrix at the position coordinates $(i, j)^T$ of the region P. The corrector 32A obtains values obtained by multiplying the matrix expressed by the expression (11) by the pixel group x(i, j) of each region P resulting from the correction based on the first parallax number. The corrector 32A calculates the multiplication value A(i, j)×x(i, j) as the pixel group of each region P resulting from the correction according to the first parallax number and the light beam luminance in this embodiment.

Note that the corrector 32A obtains the pixel group (see an expression (14) below) of each region P resulting from the correction according to the first parallax number and the light beam luminance by an expression (12) so that the difference from the pixel range y(i, j) of the parallax images acquired by the first acquiring unit 30 is minimum:

$$By(i,j) - A(i,j) \times (i,j) \quad (12).$$

In the expression (12), the matrix B specifies which parallax image (parallax number k) is observed and from which observing point position (observing point position $P_m$) the parallax image is observed. For example, in a case where the number K of parallaxes is five and the number M of observing point positions is two, the matrix B can be expressed by an expression (13):

$$B = \begin{bmatrix} 0 & 0 & 1 & 0 & 0 \\ 0 & 0 & 0 & 1 & 0 \end{bmatrix}. \quad (13)$$

The expression (13) represents a matrix B that specifies that a parallax image with a parallax number k=3 is observed from an observing point position $P_m = P_1$ and that a parallax image with a parallax number k=4 is observed from an observing point position $P_m = P_2$. The matrix is not limited to the matrix by expressed by the expression (13) but may be any matrix in which the number of columns is the number of parallaxes and the number of rows is the number of observing point positions.

The corrector 32A then obtains the pixel group (see the expression (14)) of each region P resulting from the correction according to the first parallax number and the light beam luminance by the following expression (15) below, for example:

$$\hat{x}(i, j); \quad (14)$$

$$\hat{x}(i, j) = \underset{x}{\operatorname{argmin}}(By(i, j) - A(i, j)x(i, j))^T (By(i, j) - A(i, j)x(i, j)). \quad (15)$$

The expression (14) represents an optimized parallax image resulting from the correction. In other words, the expression (14) represents the pixel group of each region P resulting from the correction according to the first parallax number and the light beam luminance. The expression (15) is an expression for obtaining the expression (14) that minimizes $(By(i, j) - A(i, j) \times (i, j))^T (By(i, j) - A(i, j) \times (i, j))$.

As a result, the corrector 32A corrects the luminance of pixels at a position corresponding to each region P in the parallax images to the luminance of pixels of parallax images identified by the first parallax number.

Note that the method for the correction process performed by the corrector 32A is not limited to the method described above. For example, simultaneous linear equations expressed by the following expression (16) may be used:

$$By(i,j) - A(i,j) \times (i,j) = 0 \quad (16).$$

Specifically, the corrector 32A may obtain the pixel group (see the expression (14)) of each region P resulting from the correction according to the first parallax number and the light beam luminance by the expression (12) so that the difference from the pixel range y(i, j) of the parallax images acquired by the first acquiring unit 30 becomes 0 (zero).

In this case, the corrector 32A may obtain the pixel group (see the expression (14)) of each region P resulting from the correction according to the first parallax number and the light beam luminance by the following expression (17):

$$\hat{x}(i,j) = A^\dagger(i,j) y(i,j) + (I - A^\dagger(i,j) A(i,j)) z(i,j) \quad (17).$$

$$A^\dagger(i,j) \quad (18)$$

The expression (18) in the expression (17) is a generalized matrix of A(i, j). In the expression (17), I represents a unit matrix, Z(i, j) represents a certain vector in the same dimension as the number of parallaxes. The vector may be set in any way, and is preferably set to y(i, j).

The corrector 32A may alternatively perform the correction process by using the following expressions (19) and (20):

$$\frac{\partial E}{\partial x} = -A(i, j)^T (By(i, j) - A(i, j)x(i, j)) = 0; \quad (19)$$

$$\hat{x}(i, j) = (A(i, j)^T A(i, j))^{-1} A(i, j)^T By(i, j). \quad (20)$$

Specifically, the corrector 32A may obtain the pixel group (see the expression (14)) of each region P resulting from the correction according to the first parallax number and the light beam luminance by the expression (12) so that the difference from the pixel range y(i, j) of the parallax images acquired by the first acquiring unit 30 satisfies the relation defined in the expression (19).

Preferably, the pixel group (see the expression (14)) of each region P resulting from the correction that is a solution of the expression (20) is subject to a constraint condition such as being sufficiently close to y(i, j). In this case, the following expression (21) may be used in place of the expression (20) described above:

$$\hat{x}=(i,j)=(A(i,j)^T A(i,j)+I)^{-1}(A(i,j)^T B+I)y(i,j) \quad (21).$$

Alternatively, the corrector 32A may obtain the pixel group (see the expression (14)) of each region P resulting from the correction as expressed by the expression (14) by analytically calculating By(i, j)−A(i, j)x(i, j)=0.

Still alternatively, the corrector 32A may obtain the pixel group of each region P resulting from the correction as expressed by the expression (14) by using a nonlinear optimization method such as the steepest decent method and the gradient method.

Next, procedures of image processing performed by the image processing device 12A will be described. FIG. 15 is a flowchart illustrating procedures of the image processing performed by the image display apparatus 10A according to this embodiment.

First, the first acquiring unit 30 acquires a plurality of parallax images (step S200). Next, the corrector 32A reads the observing point position stored in the second storage unit 38 (step S204).

Next, the image processing device 12A repeats the processes in the following steps S206 to S210 the number of times corresponding to the predetermined number of the regions P into which the display device 14 is divided.

First, the second acquiring unit 36 reads the luminance distribution corresponding to a region P to be corrected read in step S204 described above (step S206). Next, a second acquiring unit 36A acquires the first parallax number associated with the observing point position of the viewer read in step S204 described above and the region P to be corrected from the first storage unit 34 (step S208).

Next, the corrector 32A corrects pixels at a position corresponding to the region P to be corrected in the parallax images obtained in step S200 described above to pixels of the first parallax number to be observed on the basis of the observing point position obtained in step S204, the first parallax number obtained in step S206 described above and the luminance distribution read in step S206 described above (step S210).

As a result of performing the processes in steps S206 to S210 for all of a plurality of regions P in the display device 14, the parallax images obtained from the first acquiring unit 30 are corrected to generate corrected parallax images.

Next, the first generator 40 generates a three-dimensional image from the corrected parallax images (step S212). Next, the output unit 42 displays the three-dimensional image generated in step S212 on the display panel 20 (step S214), and this routine is terminated.

Figure 16:
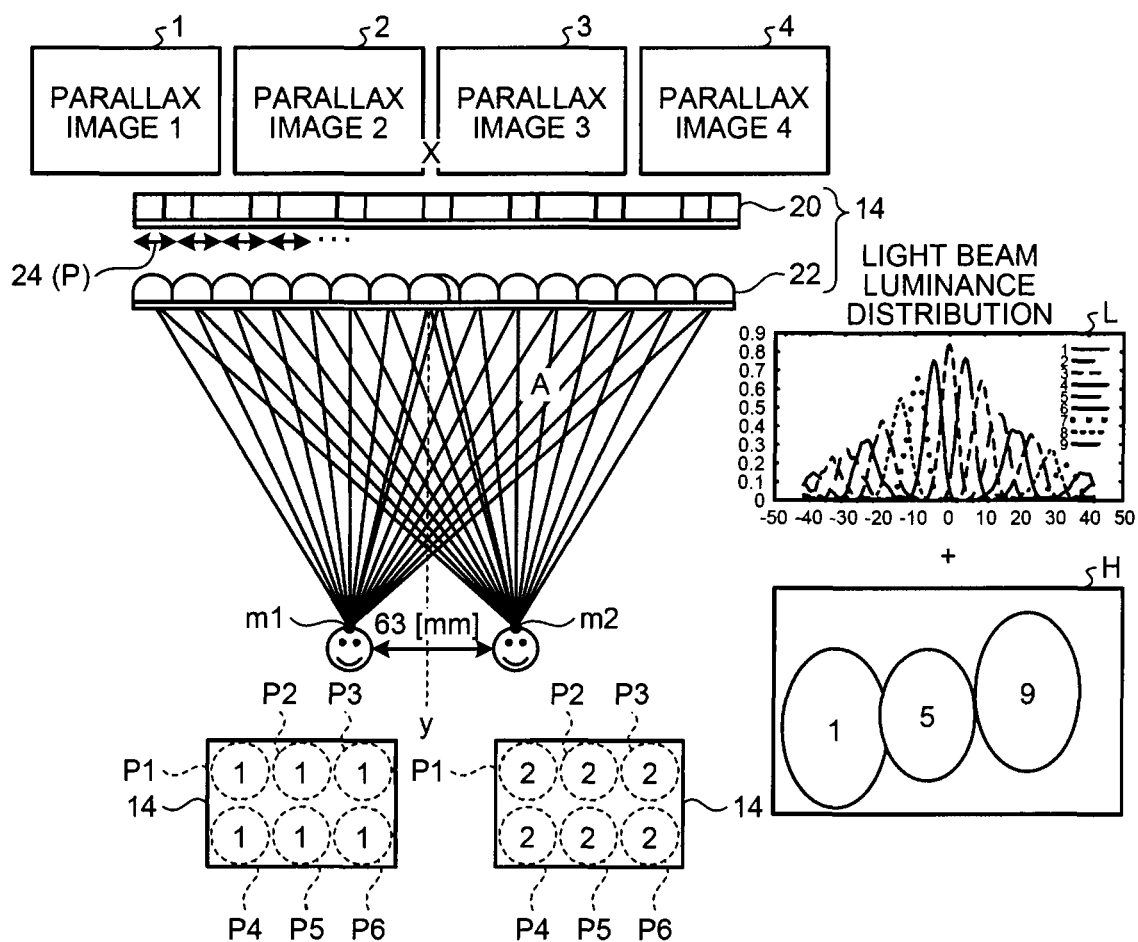
FIG. 16 is a schematic diagram illustrating correction of parallax images.

FIG. 16 is a schematic diagram illustrating the correction of parallax images with the parallax numbers corresponding to the pixels of the element image 24 in each region P.

FIG. 16 is a diagram schematically illustrating the pixels with parallax numbers observed from the observing point position m for each region P of the display device 14 in a case where the number of parallaxes is nine. The numbers in FIG. 16 represent the parallax numbers.

It is assumed that a parallax image with the parallax number 1 is used as the parallax image with the parallax number to be observed from an observing point position m1 in the image display apparatus 10A. It is also assumed that a parallax image with the parallax number 2 is used as the parallax image with the parallax number to be observed from an observing point position m2.

With the image display apparatus 10A in a favorable state, pixels of the parallax image with the parallax number 1 is observed in all the regions P (P1 to P6) of the display device 14 when the display device 14 is viewed with one eye from the observing point position m1. In addition, with the image display apparatus 10A in a favorable state, pixels of the parallax image with the parallax number 2 is observed in all the regions P (P1 to P6) of the display device 14 when the display device 14 is viewed with one eye from the observing point position m2.

If the luminance distribution corresponding to each region P of the display device 14 (see L in FIG. 16) or the directions of light beams emitted from the pixels of the element image of each region P are non-uniform (see H in FIG. 16), the entire screen does not become a normal viewing zone and thus a stereoscopic vision cannot be obtained.

The image display apparatus 10A of this embodiment therefore corrects the acquired parallax images by correcting the light beam luminance A of the acquired parallax images by the first parallax number on the basis of the luminance distribution corresponding to each region P and the first parallax number associated with each region P and the observing point positions.

Specifically, the image display apparatus 10A corrects the parallax numbers of the pixels in the element image 24 in each region P of the display device 14 to those of the parallax images to be observed (see parallax images 1 to 4 with the parallax numbers 1 to 4 in FIG. 16).

Figure 17:
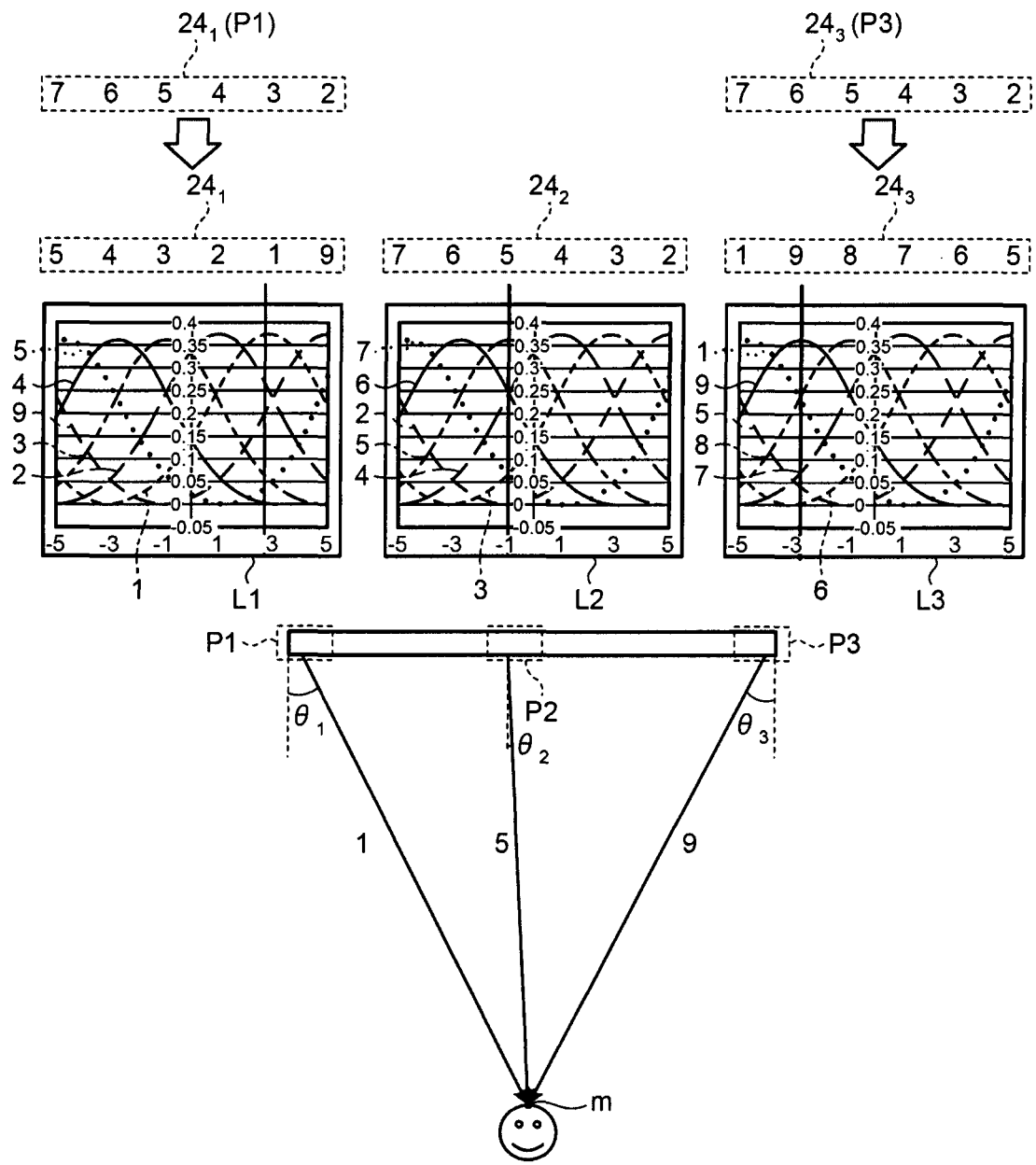
FIG. 17 is a schematic diagram illustrating correction of luminance distribution.

FIG. 17 is a schematic diagram illustrating the correction of the luminance distribution by the first parallax number.

As illustrated in FIG. 17, a region P1 observed at an angle $\theta_1$ from an observing point position m, a region P2 observed at an angle $\theta_2$ from the observing point position m and a region P3 observed at an angle $\theta_3$ from the observing point position m are assumed.

It is also assumed that the arrangement of the parallax numbers of the pixels in each of the element images 24 (element image $24_1$ to $24_3$) in the regions P1 to P3, respectively, in a three-dimensional image generated from the parallax images acquired by the first acquiring unit 30 is 7, 6, 5, 4, 3, 2, 1, 9, 8 (1, 9 and 8 are not illustrated).

Then, the arrangement of the parallax numbers of the pixels in the element image $24_1$ in the region P1 is corrected to 5, 4, 3, 2, 1, 9, 8, 7, 6 (6 to 8 are not illustrated), for example, by the correction based on the first parallax number by the corrector 32A. It is also assumed that the arrangement of the parallax number of the element image $24_2$ in the region P2 is the same as that before the correction. Furthermore, the arrangement of the parallax numbers of the element image $24_3$ in the region P3 is corrected to 1, 9, 8, 7, 6, 5, 4, 3, 2 (4 to 2 are not illustrated), for example.

Then, the corrector 32A corrects the luminance of the pixels in each region P to the luminance of the corrected parallax numbers in the corrected arrangement of the parallax numbers.

As described above, the image processing device 12A corrects the luminance of pixels at a position corresponding to each region P in the parallax images to the luminance of pixels of parallax images identified by the first parallax image according to the luminance distribution corresponding to the positional relation between each region P and the observing point position.

It is therefore possible to make the screen resulting from part of light beams from pixels displaying a certain pixel being mixed to light beams from pixels displaying another parallax image be a normal viewing zone.

Third Embodiment

An image processing device according to this embodiment performs correction using filter coefficients (luminance filters) corresponding to the luminance distribution in the image processing device 12A according to the second embodiment. As a result, the screen can be made a normal viewing zone with a smaller processing cost.

A filter coefficient is a coefficient for converting a parallax image (specifically, a pixel group y(i, j) in each region P before the correction) so that light beams from pixels with the first parallax numbers to be observed reach a preset observing point position when the region P is viewed from the observing point position. Differences from the aforementioned embodiment will be described below.

Figure 18:
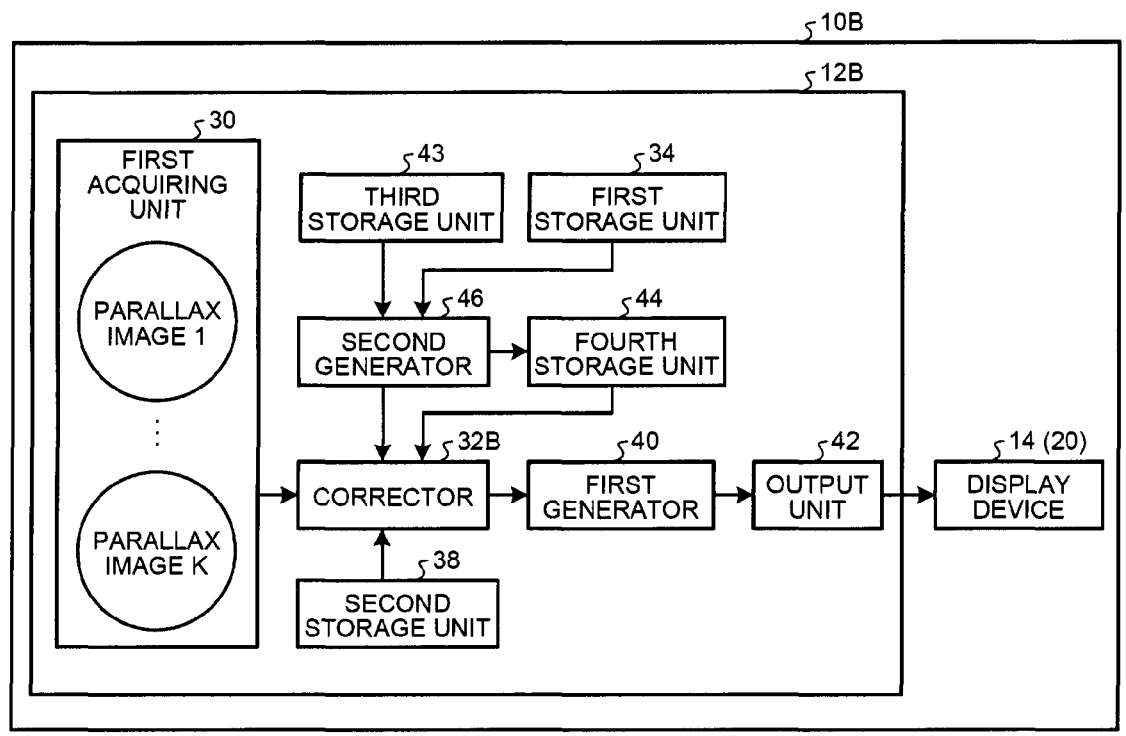
FIG. 18 is a block diagram of an image processing device according to a third embodiment.

FIG. 18 is a block diagram illustrating an image processing device 12B of an image display apparatus 10B. The image processing device 12B further includes a second generator 46 and a fourth storage unit 44. In addition, the third storage unit 43 and the first storage unit 34 are connected to the second generator 46. Furthermore, a corrector 32B is provided instead of the corrector 32A. The corrector 32B is connected to the second generator 46, the fourth storage unit 44, the first acquiring unit 30, the first generator 40 and the second storage unit 38. The fourth storage unit 44 is connected to the second generator 46 and the corrector 32B.

The fourth storage unit 44 stores one or more luminance filters G(i, j) for the respective regions P. Desirably, the luminance filters G(i, j) are equivalent to the luminance distribution H(i, j) in the aforementioned embodiment. The fourth storage unit 44 stores the luminance filters for the respective regions P.

The second generator 46 generates a luminance filter from the first parallax numbers and the luminance distribution associated with each region P and the observing point position and stores the generated luminance filter in the fourth storage unit 44.

Specifically, the second generator 46 generates a luminance filter by the following method.

There is a method in which the corrector 32B obtains a pixel group (see the expression (14)) of each region P resulting from correction according to the first parallax numbers and the light beam luminance by the following expression (22) that is the same as the expression (17) as described in the second embodiment:

$$\hat{x}(i,j) = A^\dagger(i,j)y(i,j) + (I - A^\dagger(i,j)A(i,j))x(i,j) \quad (22).$$

It is assumed here that the relation of the following expression (23) is satisfied. Then, the expression (22) can be expressed by an expression (24):

$$z(i,j) = y(i,j) \quad (23);$$

$$\hat{x}(i,j) = (A^\dagger(i,j) + (I - A^\dagger(i,j)A(i,j)))y(i,j) \quad (24).$$

When it is assumed that the equation in the following expression (25) is satisfied, the expression (22) is further expressed by an expression (26):

$$G(i,j) = A^\dagger(i,j) + (I - A^\dagger(i,j)A(i,j)) \quad (25);$$

$$\hat{x}(i,j) = G(i,j)y(i,j) \quad (26).$$

In the expression (26), G(i, j) is not dependent on the pixel group y(i, j) of each region P before the correction in a three-dimensional image generated by the input parallax images but is only dependent on the luminance distribution. G(i, j) can thus be calculated in advance.

The second generator 46 calculates G(i, j) as a filter coefficient associated with the position coordinates $(i, j)^T$ of a region P and stores the filter coefficient in the fourth storage unit 44 in advance.

The corrector 32B may obtain the pixel group of each region P represented by the following expression (27) resulting from the correction by reading G(i, j) that is the filter coefficient associated with the position coordinates $(i, j)^T$ of the region P from the fourth storage unit 44 and multiplying the pixel group y(i, j) of each region P before the correction by G(i, j):

$$\hat{x}(i,j) = G(i,j)y(i,j) \quad (27).$$

According to this embodiment, the screen can be made a normal viewing zone with a small processing cost.

Modified Example

The fourth storage unit 44 does not have to store all of the filter coefficients G(i, j) associated with the respective regions P. In this case, the second generator 46 or the corrector 32B may generate filter coefficients G(i, j) associated with the respective regions P by interpolation from another or a plurality of other filter coefficients G (i, j) stored in the fourth storage unit 44.

Figure 19:
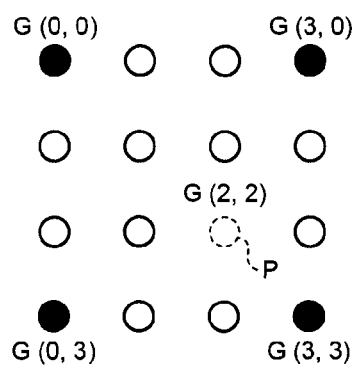
FIG. 19 is a schematic diagram illustrating interpolation of a filter coefficient.

FIG. 19 is a schematic diagram illustrating the interpolation. It is assumed, for example, that four filter coefficients G(0, 0), G(3, 0), G(0, 3) and G(3, 3) are stored in the fourth storage unit 44 as illustrated in FIG. 19. In this case, the second generator 46 may obtain a filter coefficient G(2, 2) for a region P (2, 2) by an expression (28).

$$G(2,2) = \alpha G(0,0) + \beta G(3,0) + \gamma G(0,3) + \lambda G(3,3) \quad (28).$$

$\alpha$, $\beta$, $\gamma$ and $\lambda$ in the expression (28) are weighting factors that are obtained by internal ratios of the coordinates.

According to this modified example, the storage capacity of the fourth storage unit 44 can be reduced.

Programs for performing the image processing performed in the image display apparatus 10, the image display apparatus 10A and the image display apparatus 10B in the first to third embodiments are embedded in a ROM or the like and provided therefrom.

The programs for performing the image processing performed in the image display apparatus 10, the image display apparatus 10A and the image display apparatus 10B in the first to third embodiments may be recorded on a computer readable recording medium such as CD-ROM, a flexible disk (FD), a CD-R, and a DVD (digital versatile disk) in a form of a file that can be installed or executed, and provided therefrom.

Furthermore, the programs for performing the image processing performed in the image display apparatus 10, the image display apparatus 10A and the image display apparatus 10B in the first to third embodiments may be stored on a computer system connected to a network such as the Internet, and provided by being downloaded via the network. Alternatively, the programs for performing the image processing performed in the image display apparatus 10, the image display apparatus 10A and in the image display apparatus 10B in the first to third embodiments may be provided or distributed through a network such as the Internet.

The programs for performing the image processing performed in the image display apparatus 10, the image display apparatus 10A and the image display apparatus 10B in the first to third embodiments have a modular structure including the respective units described above. In an actual hardware configuration, a CPU (a processor) reads the programs from the ROM and executes the programs, whereby the respective units described above are loaded on a main storage device and these respective functional units are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
a first acquiring unit configured to acquire a plurality of parallax images having parallax between one another;
a second acquiring unit configured to acquire identification information of a parallax image to be observed from a predetermined observing point position in each of a plurality of regions into which a display area on which a three-dimensional image is configured to be displayed is divided in a first direction and in a second direction, each of the regions including at least one element image, and the element image including each pixel in the plurality of parallax images;
a third acquiring unit configured to acquire luminance distribution corresponding to positional relations between the regions and the observing point position;
a corrector configured to:
  correct pixels at positions corresponding to the regions in the parallax images into pixels of parallax images identified by the identification information, and
  correct luminance of pixels at positions corresponding to the regions in the parallax images into luminance of pixels of parallax images identified by the identification information according to the luminance distribution; and
a first generator configured to generate the three-dimensional image from the parallax images resulting from the correction by the corrector.

2. The device according to claim 1, wherein
the second acquiring unit acquires same identification information among the regions as identification information of parallax images to be observed at the regions from one observing point position.

3. The device according to claim 1, further comprising:
a second generator configured to generate a filter coefficient for correcting luminance of pixels at positions corresponding to the regions in the parallax images into luminance of pixels of parallax images identified by the identification information according to the luminance distribution, wherein
the corrector corrects luminance of pixels at positions corresponding to the regions in the parallax images into luminance of pixels in parallax images identified by the identification information by filtering using the filter coefficient.

4. The device according to claim 3, further comprising
a storage unit configured to store the filter coefficient corresponding to the positional relations between the regions and the observing point position.

5. The device according to claim 4, wherein
the corrector corrects luminance of pixels at positions corresponding to the regions in the parallax images into luminance of pixels of parallax images identified by the identification information
  by interpolating the filter coefficient according to the positional relations between the regions and the observing point position and
  by performing filtering, using the filter coefficient obtained by the interpolation.

6. An image processing method comprising:
acquiring a plurality of parallax images having parallax between one another;
acquiring identification information of a parallax image to be observed from a predetermined observing point position in each of a plurality of regions into which a display area on which a three-dimensional image is configured to be displayed is divided in a first direction and in a second direction, each of the regions including at least one element image, and the element image including each pixel in the plurality of parallax images;
acquiring luminance distribution corresponding to positional relations between the regions and the observing point position;
correcting pixels at positions corresponding to the regions in the parallax images into pixels of parallax images identified by the identification information;
correcting luminance of pixels at positions corresponding to the regions in the parallax images into luminance of pixels of parallax images identified by the identification information according to the luminance distribution; and
generating the three-dimensional image from the parallax images resulting from the correction at the correcting pixels.

7. A computer program product comprising a computer-readable medium including programmed instructions stored therein for image processing, wherein the instructions, when executed by a computer, cause the computer to perform:
acquiring a plurality of parallax images having parallax between one another;
acquiring identification information of a parallax image to be observed from a predetermined observing point position in each of a plurality of regions into which a display area on which a three-dimensional image is configured to be displayed is divided in a first direction and in a second direction, each of the regions including at least one element image, and the element image including each pixel in the plurality of parallax images;

acquiring luminance distribution corresponding to positional relations between the regions and the observing point position;

correcting pixels at positions corresponding to the regions in the parallax images into pixels of parallax images identified by the identification information;

correcting luminance of pixels at positions corresponding to the regions in the parallax images into luminance of pixels of parallax images identified by the identification information according to the luminance distribution; and generating the three-dimensional image from the parallax images resulting from the correction at the correcting pixels.

8. An image display apparatus comprising:

the image processing device according to claim 1; and a display device configured to display the three-dimensional image.

\* \* \* \* \*